US008542445B2

(12) United States Patent
Bolis

(10) Patent No.: US 8,542,445 B2
(45) Date of Patent: Sep. 24, 2013

(54) OPTICAL DEVICE WITH MEMBRANE THAT CAN BE DEFORMED BY ELECTROSTATIC ACTUATION

(75) Inventor: Sebastien Bolis, Crolles (FR)

(73) Assignee: Commissariat a l'Energie Atomique, Paris (FR)

( * ) Notice: Subject to any disclaimer, the term of this patent is extended or adjusted under 35 U.S.C. 154(b) by 288 days.

(21) Appl. No.: 12/669,323

(22) PCT Filed: Jul. 17, 2008

(86) PCT No.: PCT/EP2008/059392
§ 371 (c)(1),
(2), (4) Date: Jan. 15, 2010

(87) PCT Pub. No.: WO2009/010562
PCT Pub. Date: Jan. 22, 2009

(65) Prior Publication Data
US 2010/0195213 A1    Aug. 5, 2010

(30) Foreign Application Priority Data
Jul. 19, 2007   (FR) .................................. 07 56619

(51) Int. Cl.
*G02B 1/06*    (2006.01)
*G02B 3/12*    (2006.01)

(52) U.S. Cl.
USPC .......................................... 359/665; 359/666

(58) Field of Classification Search
USPC ................................. 359/665–667
See application file for complete search history.

(56) References Cited

U.S. PATENT DOCUMENTS

| 4,783,155 A | * | 11/1988 | Imataki et al. ................ 359/666 |
| 5,138,494 A | | 8/1992 | Kurtin |
| 5,917,657 A | | 6/1999 | Kaneko et al. |

(Continued)

FOREIGN PATENT DOCUMENTS

| CH | 159709 | 1/1933 |
| JP | 60-220301 | 11/1985 |

(Continued)

OTHER PUBLICATIONS

Gilbert Reyne, "Electromagnetic actuation for MOEMS, examples, advantages and drawbacks of MAGMAS", Journal of Magnetism and Magnetic Materials, vol. 242-245, part 2, proceedings of the Joint European Magnetic Symposia, JEMS'01. Part II, Apr. 2002, pp. 1119-1125.

(Continued)

*Primary Examiner* — Evelyn A. Lester
(74) *Attorney, Agent, or Firm* — Oblon, Spivak, McClelland, Maier & Neustadt, L.L.P.

(57) ABSTRACT

An optical device with a deformable membrane including an anchoring area on a support helping to contain a constant volume of liquid in contact with one of its faces, a substantially central area, configured to be deformed reversibly from a rest position, and an actuation mechanism displacing the liquid in the central area stressing the membrane in at least one area situated strictly between the central area and the anchoring area. The actuation mechanism is electrostatic and includes at least one pair of opposing electrodes, one of the electrodes of the pair being at the level of the membrane, the other being at the level of the support, the electrodes being separated by dielectric, the dielectric being formed at least by the liquid.

26 Claims, 21 Drawing Sheets

(56) References Cited

U.S. PATENT DOCUMENTS

| | | |
|---|---|---|
| 6,344,930 B1 | 2/2002 | Kaneko et al. |
| 7,646,544 B2 * | 1/2010 | Batchko et al. ............... 359/665 |
| 2004/0240076 A1 * | 12/2004 | Silver ........................... 359/666 |

FOREIGN PATENT DOCUMENTS

| | | |
|---|---|---|
| JP | 8-114703 | 5/1996 |
| JP | 10-144975 | 5/1998 |
| JP | 11-133210 | 5/1999 |
| JP | 2002-243918 | 8/2002 |
| WO | WO 03/102636 A1 | 12/2003 |
| WO | WO 2004/059364 A1 | 7/2004 |

OTHER PUBLICATIONS

U.S. Appl. No. 12/610,719, filed Nov. 2, 2009, Bolis.
U.S. Appl. No. 12/669,266, filed Jan. 15, 2010, Bolis.
U.S. Appl. No. 13/394,641, filed Mar. 7, 2012, Moreau et al.
U.S. Appl. No. 13/395,169, filed Mar. 9, 2012, Bolis et al.

* cited by examiner

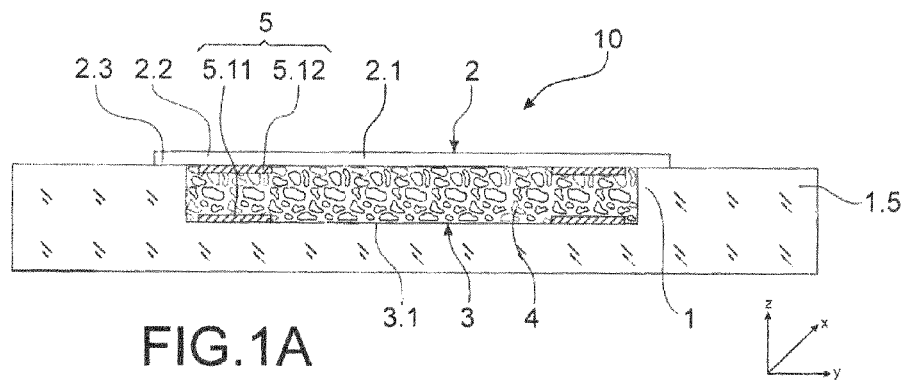
FIG.1A
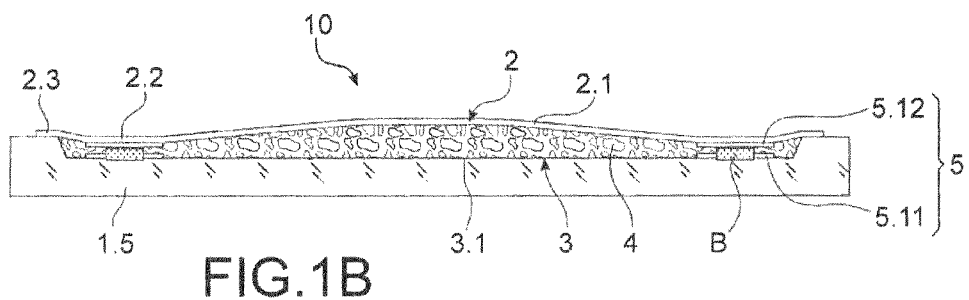
FIG.1B
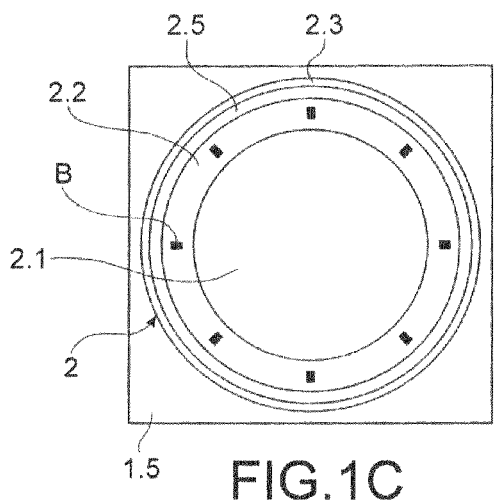  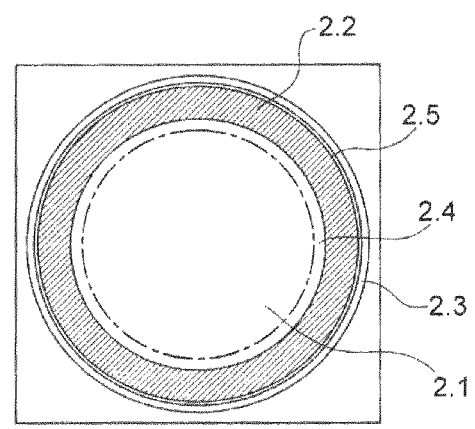
FIG.1C     FIG.2A

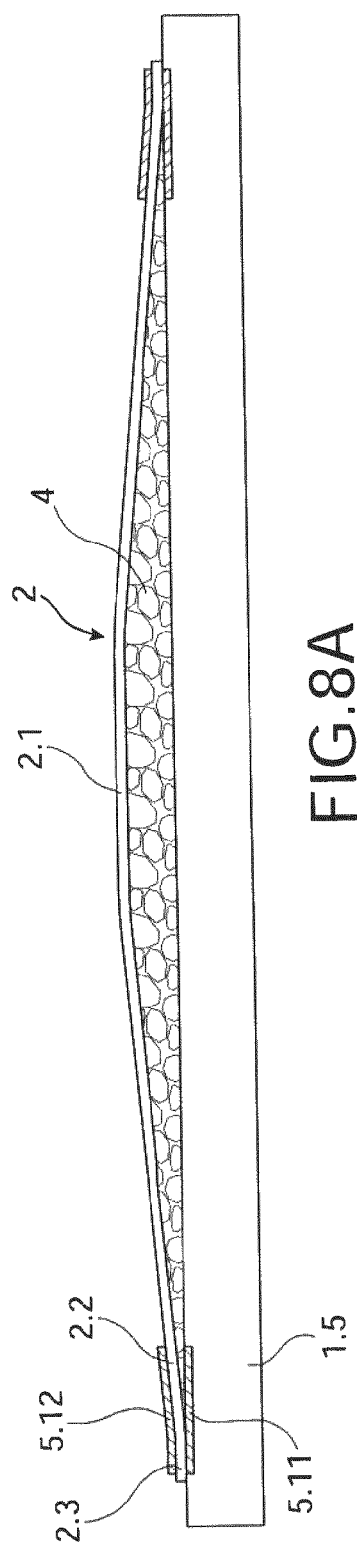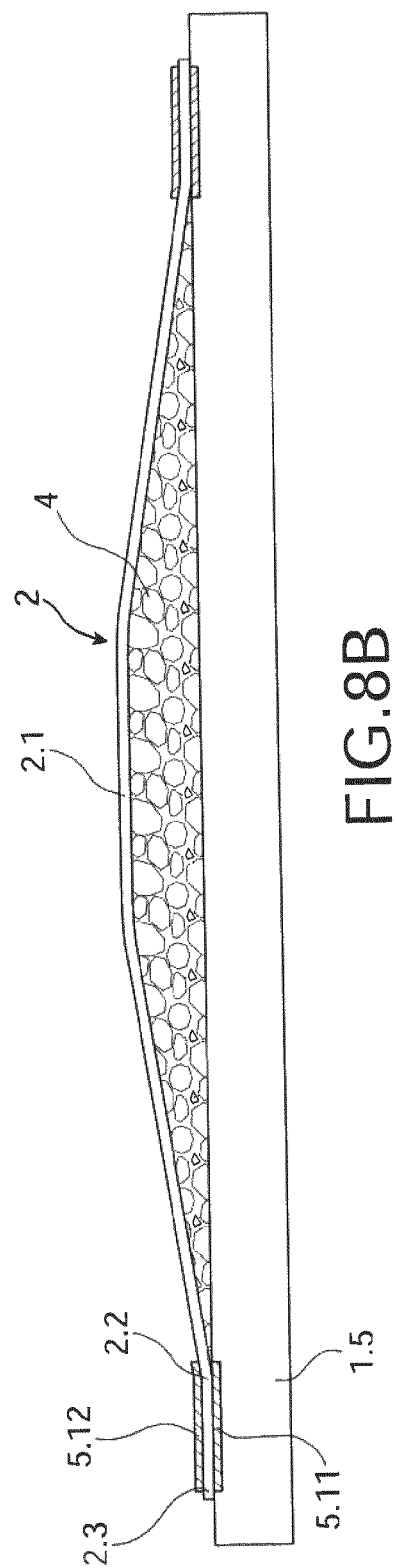

OPTICAL DEVICE WITH MEMBRANE THAT CAN BE DEFORMED BY ELECTROSTATIC ACTUATION

TECHNICAL FIELD

The present invention relates to an optical device with membrane that can be deformed by electrostatic actuation such as a variable focal distance liquid lens, a liquid lens with correction of optical aberrations in adaptive optics or even a membrane deformable mirror.

Among all the types of variable focal distance liquid lenses, there exists one formed of an optical liquid working at constant volume between walls, at least one of which may be displaced. Optical liquid is taken to mean a liquid that has optical properties appropriate to the refraction of light and which has an index greater than 1, typically 1.4 or 1.5. Hereafter, the term liquid will simply be used. However, lenses of this type are hardly used in miniature cameras such as those integrated in camera-telephones because the mechanical structures for varying their focal distance are complex, they penalise the size, the cost and the reliability of these lenses.

These miniature photo devices, working in the visible, are known as CCM (compact camera modules). Said CCM are instead provided with lenses comprising one or two liquids to which a voltage is applied in order to modify their wettability.

Nevertheless, numerous developments are underway, including in particular the autofocus function and the zoom function. The aim in introducing these functions is to obtain as short a response time as possible. More generally, the aim is to integrate the constituents of these CCM as much as possible in order to reduce the costs, size and energy consumption.

Another application concerns cameras operating in the infrared (IR). The progress in terms of integration is less, in most cases the optics are dissociated from the cameras. Several developments are underway, including in particular the integration of optics (creation of a camera module), the integration of the autofocus function, etc. For the moment, the associated technical solutions are not known and need to be defined.

In a membrane deformable mirror application, the latter is reflecting. It may be that it is wished to adjust the focal distance of the mirror and thus its radius of curvature. Such a mirror may be used in opthalmology or in adaptive optics.

STATE OF THE PRIOR ART

Optical devices with variable focal distance such as variable focal distance liquid lenses comprising a liquid working at constant volume between two walls, at least one of which is movable, have been the object of several patents, for example: U.S. Pat. No. 5,917,657, U.S. Pat. No. 6,344,930, JP-A-10-144975, JP-A-08-114 703, U.S. Pat. No. 5,138,494, WO 2003/102636, JP2002-243918 and JP-A-60 220301.

None of these patents mentions an application for a portable telephone camera, but instead for telescopes, optical microscopes and digital cameras for example. In fact, the mechanical structures associated with the membranes are all very complex and are much too expensive for this kind of application.

FIGS. 16A, 16B show two examples of variable focal distance liquid lenses, described in U.S. Pat. No. 5,917,657. These lenses are chosen because they illustrate the least complex lenses.

The liquid lens 1000 of FIG. 16A comprises a first central transparent elastic film 106a, a second central transparent elastic film 106b, a peripheral elastic film 104 and a peripheral container 105. The first and second transparent elastic films 106a, 106b are placed opposite to each other. The peripheral elastic film 104 is fixed around the first transparent elastic film 106a and the whole forms a first membrane. The second wall comprises the second elastic film. All of these elements are hermetically sealed together and contain a liquid 103. The means of commanding the lens 102, the function of which is to exercise a pressure on the liquid 103, are formed of several actuators 201 arranged in a crown shaped container 203. Their action takes place on the elastic film 104. The two containers 105, 203 are assembled face to face.

In the alternative of FIG. 16B, the elastic film 106a is replaced by a transparent plate 104b. The means of commanding the lens 1000 are now formed by an annular piezoelectric element transferred onto the peripheral elastic film 104 so as to form a unimorph structure.

These liquid lenses 1000 have drawbacks that will be listed below. Several plates and/or films are hermetically sealed together and to the container to encapsulate the liquid. In particular, one of the walls of the lens comprises either a plate joined to a film, or two films joined together. The greater the number of parts to be sealed together, the greater the risk of leaks.

In Japanese patent application JP-A-60 220301, the membrane is continuous from the centre to the edge but the actuating device is magnetic and this is not satisfactory both with regard to size or with regard to its performances and its production. Indeed the actuation device comprises a coil that needs to be supplied by an electrical current housed in the support and plates made of magnetic material, joined to the membrane and arranged in a crown between its edge and the central part. This configuration is penalising, particularly in terms of manufacture, since several materials of different natures, some of which, such as the magnetic material of the plates, are not compatible with the microelectronic environment for reasons of contamination. A double face treatment of the device is necessary to be able to form on one side the coil and on the other the plates. In addition, the coil is bulky. Moreover, a magnetic actuation is penalising both in terms of electrical consumption and in terms of heat dissipation. The drawbacks of magnetic actuators are described in the article entitled "Electromagnetic actuations for MOEMS, examples, advantages and drawbacks of MAGMAS" by Gilbert REYNE, JEMS'01 Joint European Magnetic Symposia N°1, Grenoble France 2002, vol 242-45(2), pages 1119-1125.

The methods for producing these lenses are unitary and multidisciplinary. Said methods include techniques stemming from plastics processing to elaborate and shape the films, injection and machining techniques for forming the containers. The methods for hermetically assembling films or plate to the container are different, depending on the nature of the sealing (plastic-plastic, plastic-glass, plastic-metal). In addition, the sealings to be carried out are not all situated in a same plane, which leads to awkward manipulations of films or plate, considerably complicating the method employed and the necessary tooling. These techniques are not compatible with the conventional batch production methods employed to make microelectromechanical systems MEMS or microoptoelectromechanical system MOEMS. Consequently, their cost remains high, as does their size.

Liquid lenses require as good a parallelism as possible between the periphery of the deformable wall and the edge of the container. If there is a defect, optical aberrations appear that degrade the quality of the images obtained by means of these lenses. The method of producing current liquid lenses does not enable this parallelism to be ensured.

DESCRIPTION OF THE INVENTION

The aim of the present invention is precisely to provide an optical device with deformable membrane such as a liquid lens or a mirror that does not have the above mentioned drawbacks, namely the complexity and the volume of the actuation, the incompatibility with the microelectronic environment, the impossibility of being manufactured in batches, the high risk of leaks and optical aberrations.

More specifically, the present invention relates to an optical device with deformable membrane comprising an anchoring area on a support, helping to contain a constant volume of liquid in contact with one of its faces, known as rear face, a substantially central area able to be deformed reversibly from a rest position, actuation means for displacing the liquid in the central area stressing the membrane in at least one area situated strictly between the central area and the anchoring area. The actuation means are electrostatic and comprise at least one pair of opposing electrodes, one of the electrodes of the pair being at the level of the rear face of the membrane or buried in the membrane, the other being at the level of the support, these electrodes being separated by dielectric, the dielectric being formed of liquid.

To avoid risks of short circuit, it is possible to provide for, in addition to the liquid, an additional dielectric bathed by the liquid.

The additional dielectric may be the membrane.

In an alternative, the additional dielectric may be a dielectric layer that covers the electrode of the pair situated at the level of the support.

The actuation means have a rest position in which the membrane may be concave, convex or substantially flat.

The membrane may be uniform between the optical field and the stressed area.

The stressed area may extend up to the central area without encroaching upon it or stop before the central area.

The stressed area may extend up to the anchoring area without encroaching upon it or stop before the anchoring area.

The electrode situated at the level of the membrane may be in contact with a front face of the membrane opposite the liquid or be in contact with a rear face of the membrane in contact with the liquid.

Provision may be made so that a pair of electrodes cooperates with a mechanical stop aiming to avoid the two electrodes of the pair coming into contact during the actuation.

The membrane may be monolayer or multilayer.

The electrode situated at the level of the membrane may be inserted between two layers of the membrane when it is multilayer.

The membrane may comprise at least one continuous layer that extends over the whole surface of the membrane to avoid the risk of leaks.

In one embodiment, the membrane may be made of electrically conducting material and serve as electrode.

The electrode situated at the level of the membrane may extend beyond the stressed area coming into contact with the anchoring area and if necessary with the support.

The stressed area, when it is single, surrounds the central area, when there are several stressed areas, they can each surround the central area or all of the stressed areas can surround the central area.

The stressed area may be a crown or a portion of crown, if necessary provided with radial fingers projecting towards the anchoring area or towards the central area.

The stressed areas are substantially circular, polygonal, crescent portions, angular sector portions, radial strips.

When stressed areas form a discontinuous crown around the central area, the membrane may further comprise a continuous reinforcement area surrounding the central area, more rigid than the stressed areas, situated between the central area and the stressed areas.

The support may be substantially flat or have a dish to accommodate the liquid.

It is possible that the liquid overflows from the dish.

The support may comprise a dish with a bottom and a sloping side, the electrode at the level of the support extending onto the bottom and the side.

The support may comprise a dish having a bottom provided with at least one step, the electrode at the level of the support extending onto the step.

The support may comprise a frame and a second membrane anchored on the frame, the electrode situated at the level of the support being in contact with the second membrane.

The support may comprise a frame and a transparent plate fixed to the frame helping to form a dish for the liquid, the transparent plate having substantially flat and parallel faces or one face external to the dish substantially concave or one face external to the dish substantially convex.

The support may comprise two substrates assembled together, the membrane being joined to one of the substrates, the electrode situated at the level of the support being joined to the other substrate.

It is possible to provide for capacitive means for measuring the thickness of liquid at the level of the stressed area.

The capacitive measuring means may be merged or partially merged with the electrodes of the actuation means.

The optical device may comprise means for automatically controlling the actuation means as a function of the measured thickness of liquid.

The device may be formed by microelectronic or microsystem techniques.

The membrane may be made from organic based materials such as polydimethylsiloxane, polymethyl methacrylate, polyethylene terephthalate, polycarbonate, parylene, epoxy resins or inorganic materials such as silicon, silicon oxide, silicon nitride, silicon carbide, polycrystalline silicon, titanium nitride, diamond carbon, tin and indium oxide, aluminium.

The liquid may be propylene carbonate, water, an index liquid, an optical oil such as silicone oils.

The optical device may be a liquid lens or a mirror with adjustable curvature.

The present invention also relates to a camera device comprising at least one optical device thus characterised.

BRIEF DESCRIPTION OF DRAWINGS

The present invention will be better understood on reading the description of embodiments given purely by way of indication and in no way limitative and by referring to the appended drawings, in which:

FIGS. 1A, 1B, 1C show sectional views and a top view of deformable membrane optical devices with electrostatic actuation according to the invention;

FIGS. 2A, 2B, 2C show the extent of the stressed area of optical devices according to the invention;

FIGS. 8A, 8B show in more detail the electrostatic actuation means at rest or activated of an optical device according to the invention;

Figure 2B:
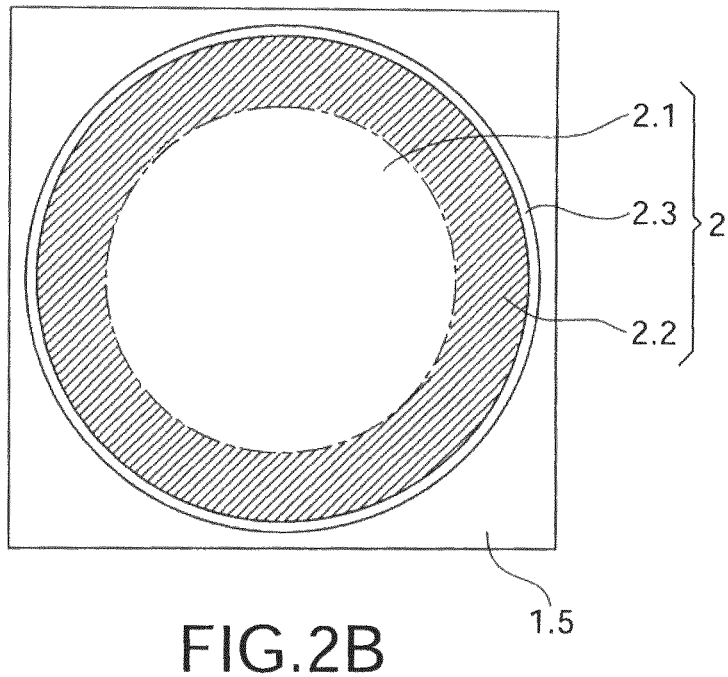

Identical, similar or equivalent parts of the different figures described hereafter bear the same numerical references so as to make it easier to go from one figure to the next.

In order to make the figures easier to read, the different parts in the figures are not necessarily represented at a uniform scale.

DETAILED DESCRIPTION OF SPECIFIC EMBODIMENTS

A first embodiment of an optical device with deformable membrane according to the invention will now be described, while referring to FIG. 1A. It is assumed that it is a liquid lens but this application is not limitative, it could be a membrane deformable mirror.

The liquid lens 10 comprises a membrane 2, the periphery of which is anchored in a sealed manner on a support 1.5. The area of the membrane that is anchored on the support 1.5 is known as anchoring area and is referenced 2.3. In this example, the anchoring takes place at a frame 1 of the support 1.5. The frame 1 helps to delimit a dish 3 formed in the support 1.5 by lining it. The dish 3 is intended to contain a constant volume of liquid 4. The support 1.5 extends along a principal plane x,y. The dish 3 has a bottom 3.1. An optical beam (not represented) is intended to traverse the liquid lens 10, while propagating through the membrane 2, the liquid 4 and the support 1.5 at the level of the bottom 3.1 of the dish 3. The frame 1 and the dish 3 are not necessary, the support 1.5 can be a substantially flat substrate. The bottom 3.1 is transparent for the optical beam used.

If the optical device was a membrane deformable mirror, the membrane would be reflecting, since such a membrane is intended to reflect an incident optical beam.

Membrane is taken to mean any flexible film serving as barrier between the liquid 4 and a fluid medium located on the other side of the barrier in relation to the liquid 4. This fluid may be quite simply air or another gas or even another liquid. The membrane 2 is in contact with the liquid 4 on one side and with the fluid on the other at least in a central area 2.1 known as optical field, not just in the application of a liquid lens but also in that of a membrane deformable mirror. Hereafter, sometimes the expression central area has been employed and at other times the expression optical field. In this context, these expressions are equivalent. In the liquid lens application, it is the optical field that is going to be traversed by the optical beam and the latter is transparent for the optical beam. In the mirror application, the membrane is reflecting in the central area where the optical beam is incident.

In order to able to vary the focal distance of the optical device, provision is made for actuation means 5, comprising at least one electrostatic actuator 5, which stresses the membrane 2 in a stressed area 2.2 located strictly between the central area 2.1 and the anchoring area 2.3. When there are several actuators 5, each of them stresses an area 2.2 of the membrane 2. The actuators 5 are able to be activated so as to take an activated position from a rest position and vice versa. The number of stressed areas depends on the number of actuators. The stressed area, if it is single, may be continuous, crown shaped, as in FIG. 2. Other shapes are possible as illustrated in FIGS. 3A to 3D described later.

If there are several stressed areas 2.2 as in FIG. 4, the latter can take a large number of shapes. Several examples of stressed areas falling within this category are represented in FIGS. 4A to 4I. All of the stressed areas 2.2 surround the central area 2.1. The different stressed areas 2.2 are preferably distributed substantially regularly around the optical field 2.1. Each actuator 5 comprises a pair of opposing electrodes 5.11, 5.12. One of the electrodes, referenced 5.12 located at the membrane 2, is moving. The other electrode 5.11, located at the support 1.5, is fixed in so far as the support is rigid at the level of the electrode 5.11. When the support is flexible at the level of the electrode 5.11, the latter is also moving. The electrostatic actuators are extremely simple and particularly compact.

In FIGS. 1A, 1B, the electrode 5.12 is joined to the membrane and is also in contact with the membrane 2. The liquid dielectric has a high permittivity compared to that of the membrane.

This is not an obligation as illustrated in FIGS. 5A to 5E. The configuration of FIG. 1 is particularly simple and has a good efficiency in the variation in the focal distance.

It is preferable that, when there are several actuators 5, the different actuators 5 are distributed substantially regularly around the central area 2.1 of the membrane 2 so that the displacement can take place in a substantially regular manner.

The two electrodes 5.11, 5.12 of an actuator 5 are separated by the dielectric, said dielectric being formed at least by the liquid 4. It is possible to provide for an additional dielectric in addition to the liquid 4. The additional dielectric may be formed by the membrane 2 and more precisely the area 2.2 of the membrane stressed by the actuator 5 as in FIG. 1A. The additional dielectric is bathed by the liquid 4. The area 2.2 of the membrane 2 stressed by the actuator 5 is traced, on one at least of the electrodes 5.11, 5.12 or on the intersection between the two electrodes of the actuator. It is obviously understood that other alternatives for the additional dielectric may be envisaged as will be seen later. The fact of providing for an additional dielectric in addition to the liquid 4 makes it possible to avoid a short circuit between the two electrodes 5.11, 5.12 of the actuator 5 in the case where the electrodes 5.11, 5.12 are pressed up against each other during the actuation of the actuator, the liquid having been evacuated laterally. During the actuation of an electrostatic actuator, the closer the electrodes, the greater the instability, from a certain distance separating them, they have a tendency to press against each other suddenly.

When the liquid 4 is the only dielectric, it is possible to provide for at least one mechanical stop B aiming to prevent the two electrodes 5.11, 5.12 pressing against each other on an actuation and creating a short circuit. Reference is made to FIGS. 1B, 1C. There are several mechanical stops B. The thickness of the mechanical stops B is greater than the sum of the thicknesses of the two electrodes 5.11, 5.12. One stop per actuator 5 may be provided for. These stops may be localised on the support 1.5, near to the fixed electrode 5.11. In FIG. 1C, the electrodes are not represented.

In the configuration of FIG. 1, the membrane 2 does not need to be made of dielectric material, it may based on silicon, silicon carbide, polycrystalline silicon, titanium nitride, diamond carbon, tin and indium oxide, aluminium.

Figure 5A:
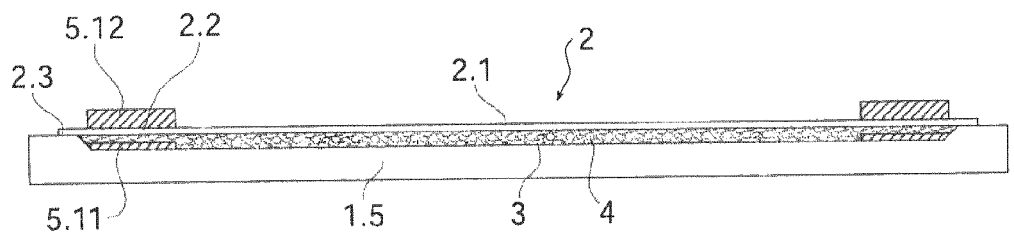
FIGS. 5A to 5J show different alternatives of actuation means of optical devices according to the invention.

In the configuration of FIG. 5A for example, the membrane 2 is made of dielectric material and more specifically organic material such as for example polydimethylsiloxane (PDMS), polymethyl methacrylate (PMMA) but also polyethylene terephthalate (PET), polycarbonate (PC), parylene, epoxy resins, or inorganic material such as silicon oxide, silicon nitride.

In the example of FIG. 1, the membrane 2 is uniform in the optical field 2.1 and in the stressed area 2.2. The membrane 2 may be monolayer in the optical field 2.1 and in the stressed area 2.2 as in FIG. 1 or be multilayer as in FIG. 51. It is formed of at least one layer that is continuous over the whole surface of the membrane of the optical field at the anchoring area.

In the context of the present patent application, the fact that the membrane is considered uniform in the two areas signifies that its physical properties are constant and the same in the two areas.

It is obviously conceivable that the membrane is not uniform in the optical field and in the stressed area, it could have different rigidities in these two areas, but in all cases, it comprises at least one continuous layer over its whole surface. The risk of leaks is thereby reduced.

Figure 13:
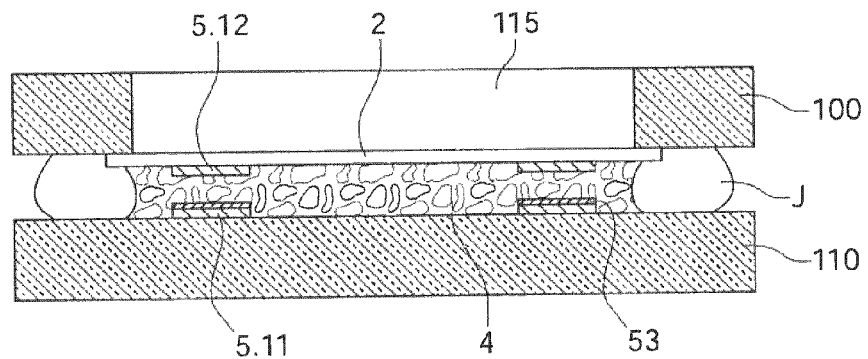
FIG. 13 shows an optical device according to the invention formed with two supports assembled together.

The support 1 may be monolithic as in FIG. 1 or be formed by the frame 1 assembled to the bottom 3.1 of the dish 3 as in FIG. 13.

The liquid 4 is dielectric, it may be propylene carbonate, water, an index liquid, an optical oil such as a silicone oil. It is chosen especially for its dielectric properties and obviously optical properties in the case of a liquid lens.

Figure 2C:
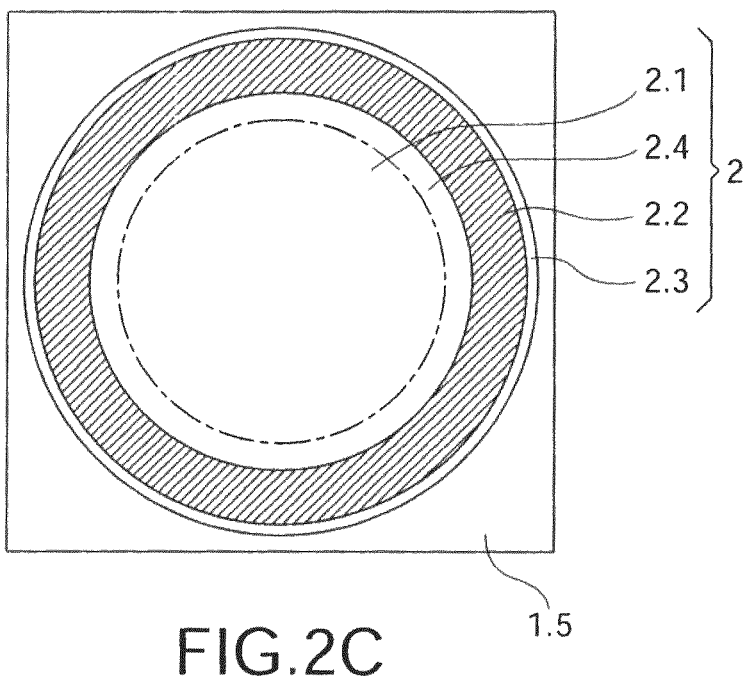
Figure 3A:
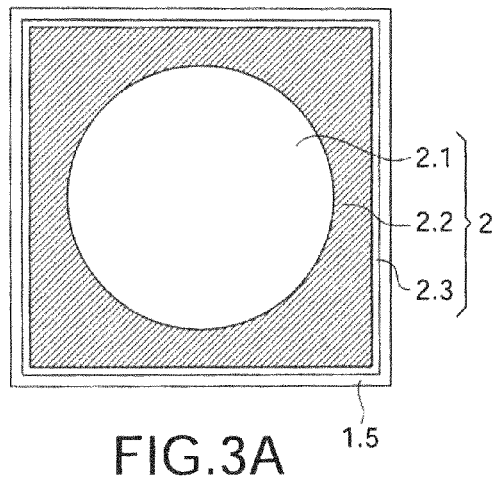
FIGS. 3A to 3D show different shapes of single stressed areas of optical devices according to the invention.
Figure 3B:
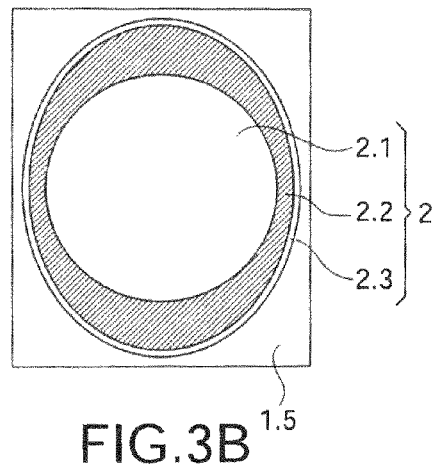

In FIG. 2, the membrane 2 has been represented circular, but other shapes are possible, it could be oblong, for example elliptic, as in FIG. 3B or even take the shape of a quadrangle for example, a square as in FIG. 3A, or other.

The principle of varying the focal distance of the optical device is as follows: under the effect of the actuation means 5, the electrodes 5.11, 5.12 of the actuators attract each other, the stressed area 2.2 of the membrane in contact with the liquid 4 approaches the bottom of the support 1.5, the liquid 4 is pushed towards the centre of the membrane 2, the optical field 2.1 is deformed in its turn and the focal distance of the optical device is thereby modified. The conservation of the volume of liquid 4, considered as substantially incompressible, trapped between the membrane 2 and the support 1.5, governs the deformations of the membrane.

Each electrostatic actuator 5 of the actuation means may be conventional, in other words with electrodes 5.11, 5.12 substantially parallel at rest position as in FIG. 1, or instead of "zipping" or progressive opening or slide type, in other words with electrodes sloping in relation to each other at rest position as in FIG. 63. The interest of the "zipping" type actuation is to obtain greater travel than with a traditional configuration with substantially parallel electrodes. The determining parameters for the actuation means 5 are the surface area of the stressed area 2.2 of the membrane 2, which correspond overall to the surface of at least one of the electrodes 5.11, 5.12 of the actuators and the strain exercised by the actuation means 5 on the membrane 2.

Different possible configurations for the stressed area 2.2 will now be considered, while referring to FIG. 2. The stressed area 2.2 stops in all cases before the optical field 2.1, it does not encroach upon it. It can extend up to the anchoring area 2.3 but does not encroach upon it either, since in the anchoring area 2.3 there is no liquid and the membrane cannot be displaced. On the other hand, the actuation means 5 may be in contact with the membrane also at the level of the anchoring area 2.3. A stressed area 2.2 is an area displaced by the actuators 5, the anchoring area 2.3 may not be included in the stressed area 2.2.

The fact that the actuation means stress the membrane in at least one strictly localised stressed area between the anchoring area and the central area means that the central area is only deformed by the pressure of the liquid that is displaced and a better efficiency of the variation in focal distance is obtained than if the central area had been stressed directly by the actuation means.

In these FIG. 2, the actuation means are not represented. In FIG. 2, there is only one stressed area 2.2, it is continuous in the shape of a crown that surrounds the optical field 2.1. What is going to be described would apply just as well if there were several of them. It is possible, as in FIG. 2B, that the stressed area 2.2 begins from the limit of the optical field 2.1. The dotted lines schematise the limit of the optical field 2.1.

It is obviously possible to interpose an intermediate guard area 2.4 between the optical field 2.1 and the stressed area 2.2 by the actuation means as in FIG. 2A and FIG. 2C. This makes it possible to avoid any degradation of the optical performances of the optical field 2.1.

An intermediate guard area 2.5 may be interposed between the stressed area 2.2 and the anchoring area 2.3 as in FIG. 2A. It is located above the liquid 4. The stressed area 2.2 may reach the anchoring area 2.3 without encroaching upon it as in FIG. 2B and FIG. 2C. There is no longer an intermediate guard area 2.5.

FIGS. 3A, 3B show respectively square or oblong membrane configurations, in this case ellipse shaped. In these two configurations, the optical field 2.1 is circular. The stressed area 2.2 is limited internally by a circle and externally respectively by a square or an ellipse.

Figure 3C:
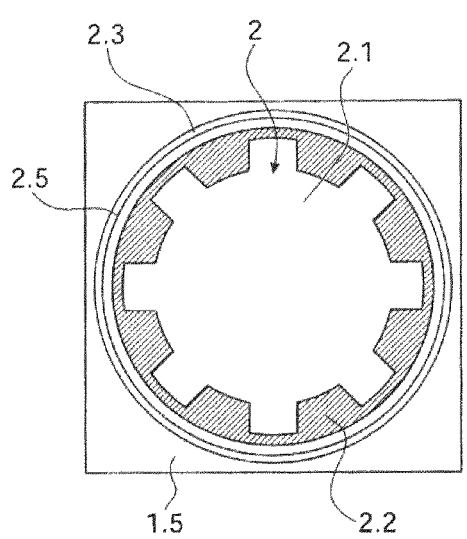

In FIG. 3C, the membrane 2 is circular, the single stressed area 2.2 takes the shape of a crown provided with radial fingers, projecting towards the optical field 2.1. Said fingers take the shape of crown sectors, but other shapes are possible, this shape is not limitative. There is a guard area 2.5 between the stressed area 2.2 and the anchoring area 2.3.

Figure 3D:
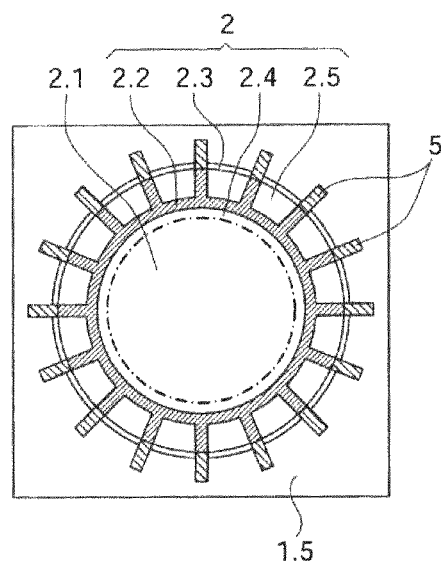

In FIG. 3D, the membrane 2 is circular, the stressed area 2.2 is single, it is of crown shape on the side of the optical field 2.1 and the crown is provided with radial fingers that project towards the anchoring area 2.3. The fingers are in strip shape but other shapes are possible. There is an intermediate split up guard area 2.5 between the crown of the stressed area 2.2 and the anchoring area 2.3 between the radial fingers. The electrostatic actuation means 5, taking the shape of a single actuator, occupy the stressed area 2.2 and continue on the anchoring area 2.3 and on the support 1.5, they extend the radial fingers to beyond the stressed area 2.2. The surface of contact of the actuator 5 with the anchoring area 2.3 and with the support 1.5 is represented with different hachuring from those of the stressed area 2.2. The part of the actuator corresponds to a portion of the moving electrode in contact with the membrane that extends on the support 1.5.

Until now, only configurations with a single stressed area 2.2 have been described, which means that the actuation means would only comprise a single actuator.

The actuation means 5 may comprise several actuators able to be actuated simultaneously. In this case, the membrane comprises several stressed areas.

Figure 4A:
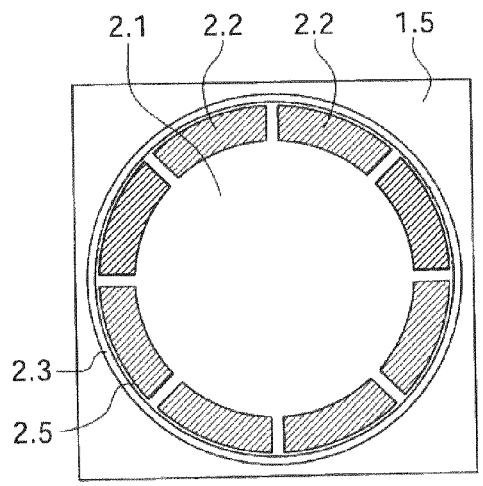
FIGS. 4A to 4I show different shapes of series of stressed areas of optical devices according to the invention.
Figure 4B:
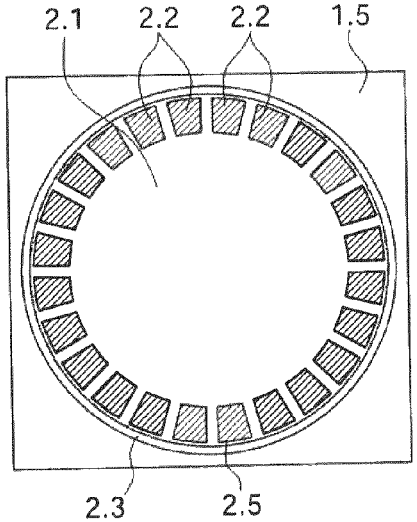
Figure 4C:
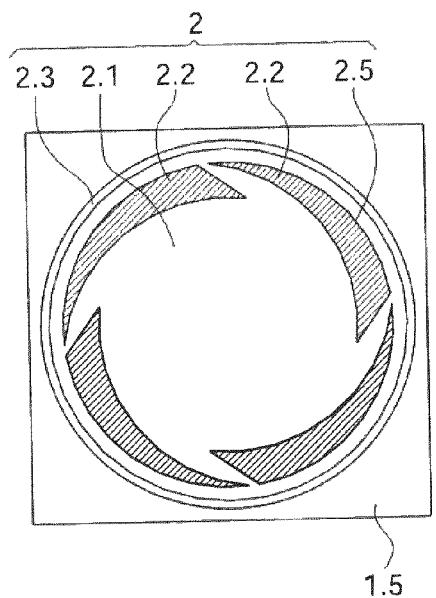
Figure 4D:
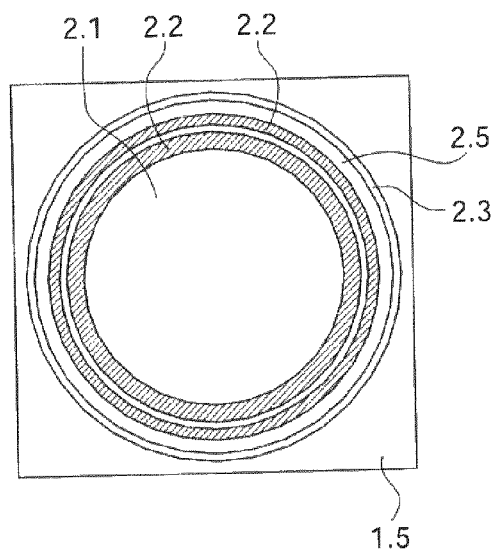

Configurations of the membrane 2 for which there are several stressed areas 2.2 and thus several actuators will now be described. In FIG. 4A, the stressed areas 2.2 are sectors of crown, in the non limitative example the crown is circular. There are 8 of them in FIGS. 4A and 24 in FIG. 4B. A different number of stressed areas 2.2 is obviously possible. In FIG. 4C, the stressed areas 2.2 are portions of crescents, the exterior edge of which is a portion of circle concentric with the edge of the membrane 2. There are four substantially identical stressed areas 2.2. It could be envisaged that they are not identical. In FIG. 4D, the stressed areas 2.2 are concentric crowns. There are two of them. It could be envisaged that at least one of them is provided with radial fingers in a manner similar to FIGS. 3C, 3D. This alternative is not represented so as not to multiply needlessly the number of figures. In these two latter figures, there is an intermediate guard area 2.5 between the anchoring area 2.3 and the stressed area 2.2.

Figure 4E:
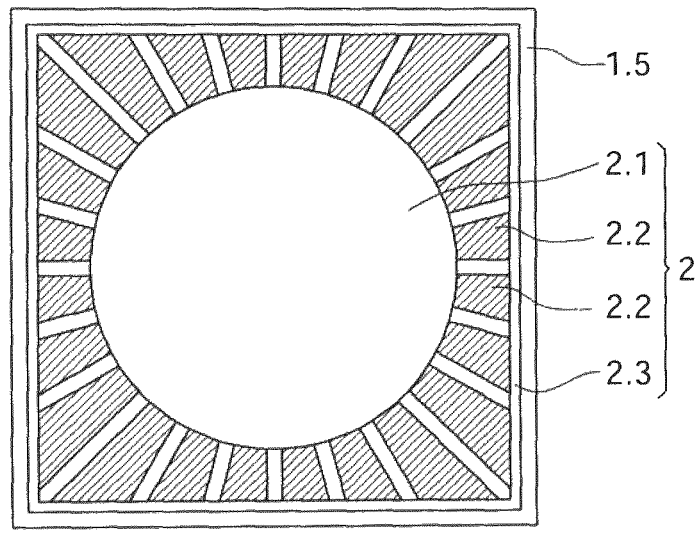

In FIG. 4E, the stressed areas 2.2 are portions of angular sectors limited internally by the optical field 2.1, in this circular example, and externally by the edge of the support 1.5 receiving the anchoring area 2.3, which in this example is square. The angular sectors have substantially the same angle at the summit, but this is not an obligation.

Figure 4F:
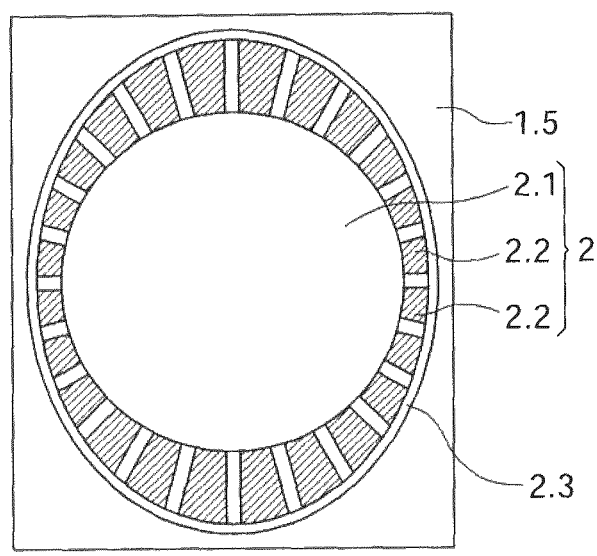

In FIG. 4F, in the same optic, the stressed areas 2.2 are portions of angular sectors limited internally by a circle that correspond to the optical field and externally by an ellipse that corresponds to the edge of the support 1.5 receiving the anchoring area 2.3. In these two examples, the different stressed areas 2 are not all identical.

Figure 4G:
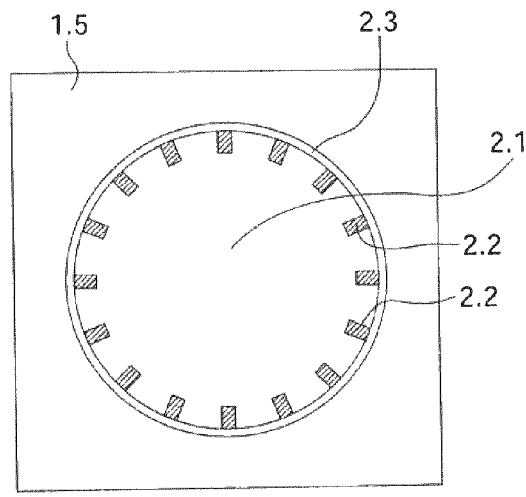

In FIG. 4G, the stressed areas 2.2 are radial strips that stop just before the anchoring area 2.3.

Figure 4H:
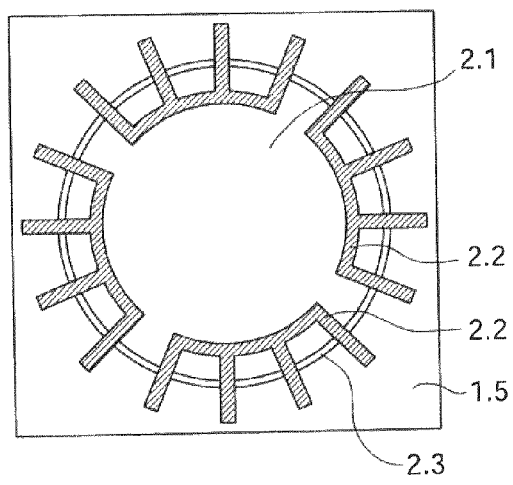

In FIG. 4H, the stressed areas 2.2 are portions of crown provided with radial fingers. This configuration resembles that of FIG. 3D with the exception that there is not just a single stressed area but several. In this example, the radial fingers project towards the anchoring area 2.3, but it could be imagined that they project towards the optical field 2.1. This latter alternative is not represented so as not to multiply needlessly the number of figures.

Figure 4I:
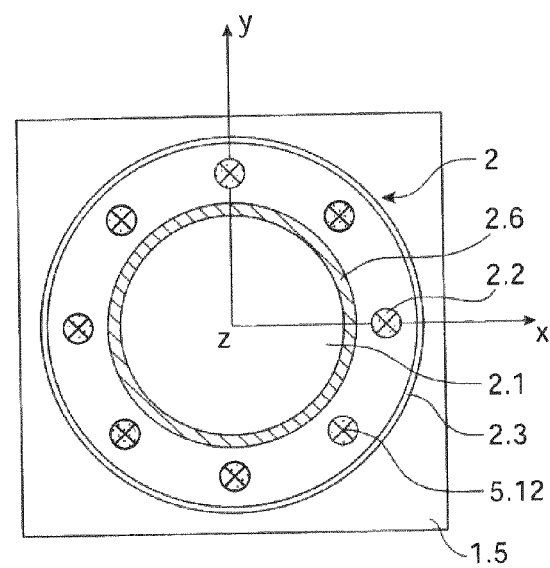

It is preferable to provide for, when there is a plurality of neighbouring stressed areas 2.2 and the plurality of stressed areas 2.2 form a discontinuous crown around the optical field 2.1, between the stressed areas 2.2 and the optical field 2.1, a reinforcement area 2.6 more rigid than the optical field 2.1. The reinforcement area 2.6 surrounds the optical field 2.1, it is continuous. The actuation means do not stress it directly. The actuation means have been materialised by the electrodes 5.12 in contact with the membrane 2 of each of the actuators. The function of the reinforcement area 2.6 is to equalise the deformation of the membrane 2 in the optical field 2.1 during the activation of the actuation means. The reinforcement area 2.6 assures the invariance by rotation of the deflection of the membrane brought about by the actuation of the actuation means around the z axis, which is an axis of symmetry. Reference is made to FIG. 4I. The stressed areas 2.2 are substantially polygonal.

In FIG. 5, different configurations for the actuation means 5 are illustrated. In FIG. 5A, the actuation means 5 have a hold on the membrane 2, via their at least one electrode 5.12 in contact with the membrane, only at the level of the stressed area 2.2 or stressed areas if there are several of them. In FIG. 5C, the actuation means 5, via their at least one electrode 5.12 in contact with the membrane, have a hold on the membrane 2 at the level of the stressed area 2.2 (or stressed areas if there are several of them) and also at the level of the anchoring area 2.3.

Figure 5B:
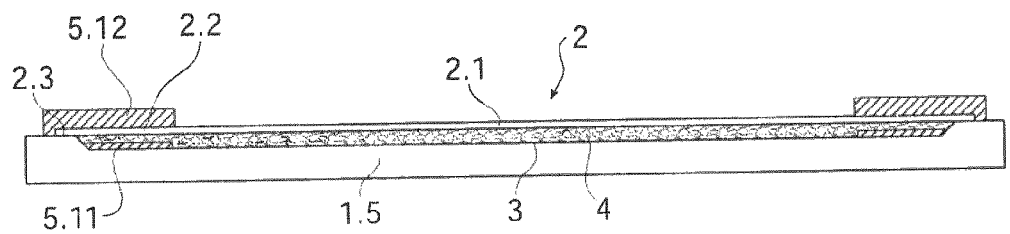

In FIG. 5B, the electrode 5.12 is in contact with the membrane 2 at the level of the stressed area 2.2 and the anchoring area 2.3 but it extends also on the support 1.5 beyond the membrane 2. The part of the electrode 5.12 that is located on the support 1.5 beyond the membrane 2 may serve as electrical supply pad for the actuation means 5.

Figure 5C:
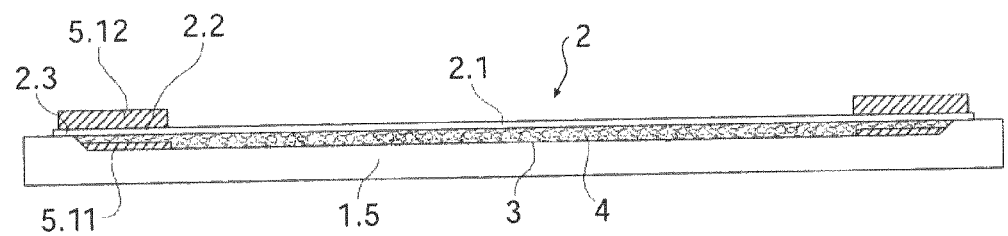

In FIGS. 5A, 5B, 5C, the moving electrode 5.12 is without contact with the liquid 4, it is on the front face of the membrane 2, if the rear face is that which is in contact with the liquid 4.

In these configurations, the stressed areas 2.2 correspond to the areas of the membrane 2 that are both in contact with the electrostatic actuators 5 and in contact with the liquid.

In FIGS. 5A to 5C, the actuation means 5 are represented at rest.

Figure 5D:
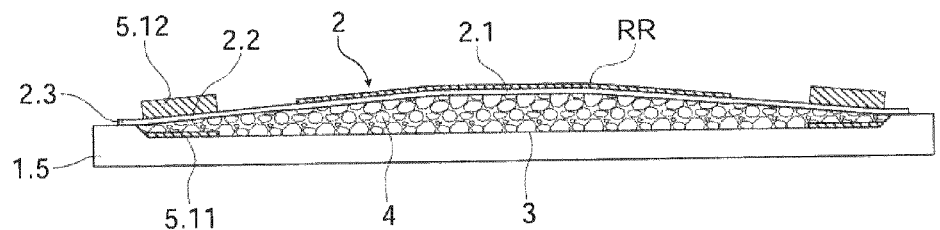
Figure 5E:
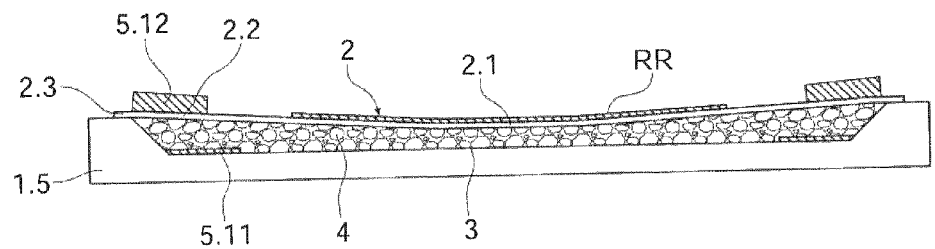

The membrane 2 may be flat when the actuation means 5 are at rest as in FIGS. 5A to 5C. The dish 3 is necessary. This corresponds to an infinite radius of curvature. In this configuration with dish 3, the electrodes are substantially parallel at rest. This configuration is advantageous to displace efficiently the liquid towards the central area, and thus to have an efficient variation in the focal distance. It is obviously possible that the membrane 2 is bulging in one direction or in the other while the actuation means 5 are at rest. It then possesses a finite radius of curvature and thus smaller. FIGS. 5D and 5E illustrate this configuration with respectively a domed (concave) membrane 4 and a dished (convex) membrane 4. It is assumed that in FIGS. 5D, 5E the membrane is reflecting and that the optical device is a mirror. On the front face of the membrane 2, at least in the central area 2.1, a reflective coating RR has been represented, which may be for example a thin layer of aluminium.

The dish 3 is represented. In these two figures, the actuators are of "zipping" type, the electrodes 5.11, 5.12 not being parallel at rest position. In these latter two figures, it is assumed that the membrane is reflecting, at least in the optical field, and that the optical device is a mirror with adjustable radius of curvature.

The examples presented in FIGS. 5A to 5E, show actuation means 5 that cooperate with the front face of the membrane 2, in other words that which is opposite to that in contact with the liquid 4. It is obviously possible that the actuation means 5 cooperate with the membrane 2 at the level of its face in contact with the liquid 4, as has already been seen.

Figure 5F:
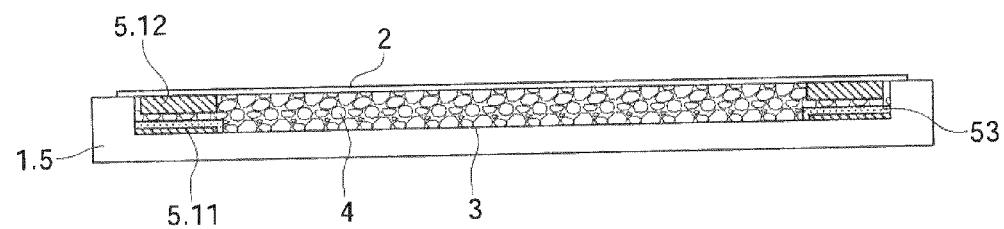

In FIG. 5F, the electrode 5.12 is in contact with the membrane 2 but also with the liquid 4. It is on the rear face of the membrane 2. The membrane 2 then no longer serves as additional dielectric. As additional dielectric 53, a layer of dielectric material may be provided for that masks the other electrode 5.11 (that which is fixed) vis-à-vis the liquid 4. The dielectric material may be for example silicon oxide or silicon nitride. If this additional dielectric material only lines the electrodes 5.11 in contact with the support 1.5, it does not need to be made of transparent material in the application of a liquid lens, since outside of the optical field.

When they are actuated from the rest position, the actuators 5 need to pull the membrane 2 to bring the stressed area 2.2 closer to the bottom 3.1 of the dish 3 or more generally to reduce the thickness of the liquid 4. In this FIG. 5F, the membrane 2 is uniform, it has a same thickness and a same rigidity between the optical field 2.1 and the stressed area 2.2.

Figure 5G:
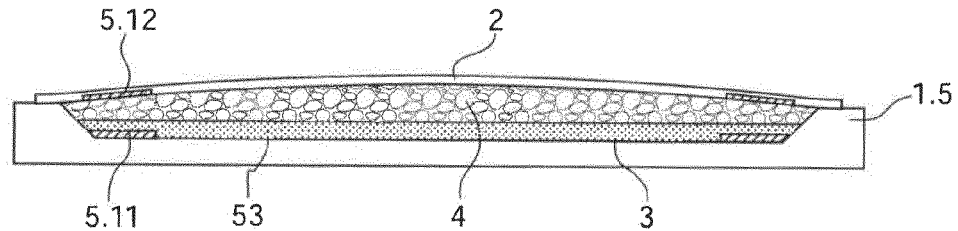

In FIG. 5G, the electrode 5.12 joined to the membrane 2 is integrated in the membrane 2. It is still in contact with the liquid 4. The thickness of the membrane 2 in the area 2.2 stressed by the actuation means 5 is less than that in the optical field 2.1. In the stressed area 2.2, the rigidity of the membrane is less than that which it has at the level of the optical field 2.1. The thickness of the stressed area 2.2 combined with that of the electrode 5.12 is substantially that of the optical field 2.1. In this FIG. 5G, the electrode 5.12 also comes into contact with the support 1.5, the membrane 2 surmounts the electrode 5.12 and also comes into contact on the support 1.5.

The additional dielectric 53 lines the whole bottom 3.1 of dish 3 or more generally the support must be in contact with the liquid 4. In this case, if the optical device is a liquid lens, the additional dielectric 53 must be transparent so that it can function in transmission. The term transparent obviously signifies transparent for the optical beam used. This condition is not necessary when working in reflection.

Figure 5H:
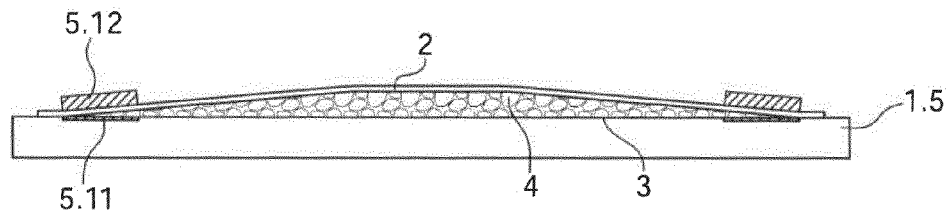
Figure 5I:
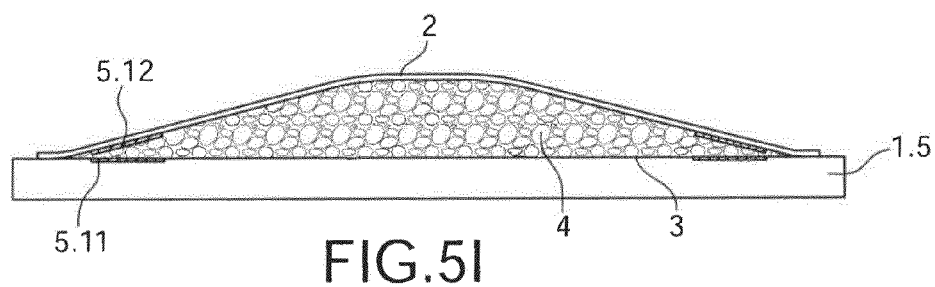

The dish 3 is not necessary as has already been indicated. It is possible that the liquid 4 lies on a substantially flat support 1.5 and that the membrane 2 contains it. Patent application EP-A-1 672 394 illustrates such a configuration of membrane containing the liquid. This alternative is represented in FIGS. 5H and 5I, the electrode 5.12 joined to the membrane 2 is located either on the front face of the membrane 2 or on the rear face. In these configurations, the membrane 2 is bulging when the actuation means 5 are at rest. The membrane 2 may be carried out by deposition of an organic film, for example parylene, directly on a drop of liquid 4, or by a method using a sacrificial layer. The support 1.5 may if necessary be treated locally to make it hydrophilic or hydrophobic depending on the areas.

Figure 5J:
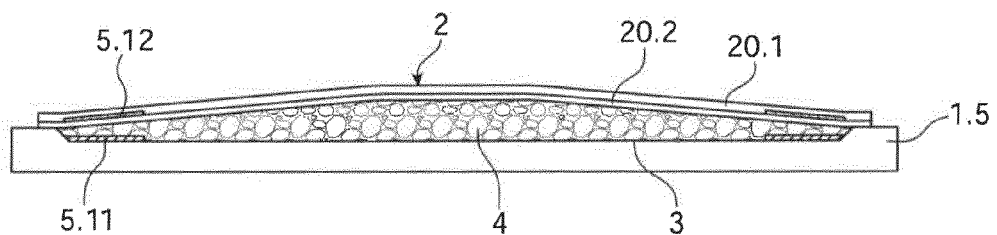

In FIG. 5J, the electrode 5.11 is buried in the membrane 2, it is sandwiched between two sub-layers 20.1, 20.2 of the membrane 2. The sub-layer 20.2 of the membrane 2 that is in contact with the liquid 4 can serve as additional dielectric, if obviously it is made of dielectric material. The other sub-layer 20.1 completes the mechanical strength of the first sub-layer 20.2 so that the membrane 2 has the performances required in the optical field.

Different configurations for the electrode 5.11 of the actuators 5, that which is in contact with the support 1.5, will now be described.

Figure 6A:
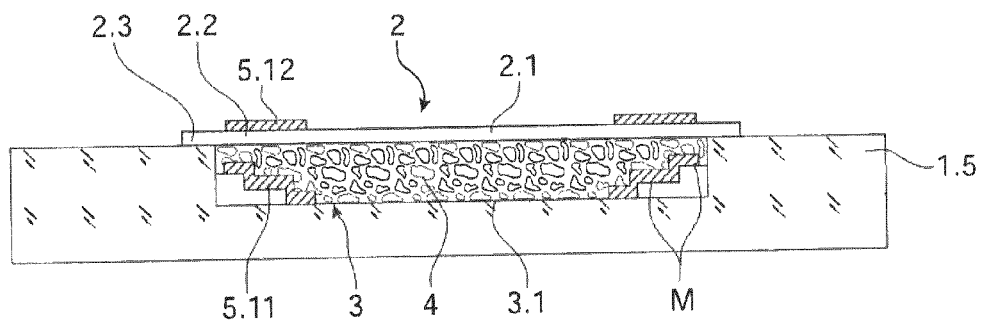
FIGS. 6A and 6B show different configurations of the electrode situated at the level of the support of optical devices according to the invention.
Figure 6B:
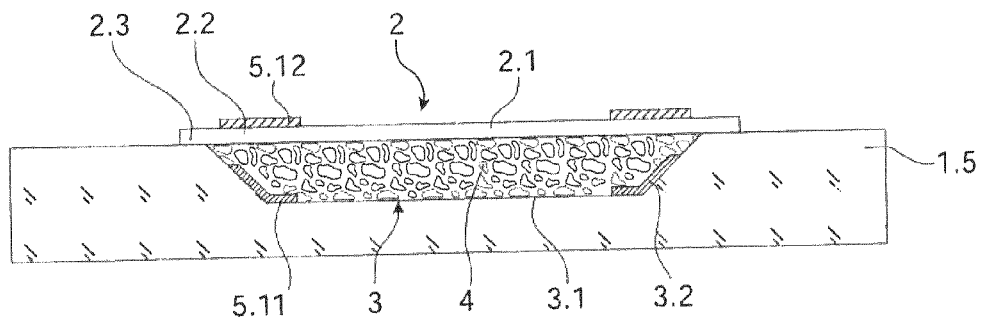

Reference is now made to FIGS. 6A, 6B. In FIG. 6A, the bottom 3.1 of the dish 3 has steps M, three in number in the non limitative example, and the electrode 5.12 that is in contact with the support lines said steps M.

In FIG. 6B, the dish 3 has a bottom 3.1 and sloping side 3.2 and the electrode 5.11 in contact with the support 1.5 lines both the bottom 3.1 and the side 3.2 of the dish 3. In this configuration, the electrodes of an actuator are sloping when it is at rest, it is of "zipping" type.

The dimensioning of the membrane 2 is guided by the behaviour that it will have in the optical field 2.1, since the variation in the focal distance of the optical device depends directly on the displacement of the optical field.

The material of the membrane 2 is chosen so that its elastic limit is sufficient to ensure it functions in the elastic domain and has deformation reversibility. It must return to its initial position once it has been deformed, by activation of the actuation means 5 when these have returned to a rest position. Numerous organic but also inorganic materials may enter into the composition of the membrane. They must be able to ensure the sealing to contain the liquid 4, particularly at the level of the anchoring. Depending on the applications and the structures, they must be transparent for the wavelength used in the case of working in transmission or must be reflecting, in the case of a mirror. They must be dielectric or, quite the opposite, electrically conducting as will be seen later.

Organic materials that may be chosen are for example polydimethylsiloxane (PDMS), polymethyl methacrylate (PMMA) but also polyethylene terephthalate (PET), polycarbonate (PC), parylene, epoxy resins, the Young's modulus of which is between several 100 MPa and several GPa. Dielectric materials that may be chosen are for example silicon oxide, silicon nitride, silicon carbide. Conductor materials that may be chosen are for example indium and tin oxide ITO, which is transparent in the visible, or aluminium, which for its part is reflecting. Other materials have been cited previously. A configuration of the optical device according to the invention will be described below in which the membrane is both electrically conducting and is either transparent, or reflecting.

For a correct operation of the variable focal distance optical device of the invention, it is desirable that its optical performances are ensured independently of its orientation.

To do this, the pressure induced by the weight of the liquid 4 on the membrane 2 in the optical field 2.1, due to the heaviness, must not bring about any deformation degrading its optical performances.

The profile of the membrane 2 has a strong influence on the shape of the dioptre of the optical field. For a flat profile, in other words for a substantially constant thickness of the membrane over its whole surface, the shape of the dioptre may be approximated by the following formula taken from the work "*Théorie des plaques et des coques*" (Theory of plates and shells) by S. Timoshenko, editor Librairie Polytechnique, Ch Béranger, 1951. One obtains:

$$\omega(r) = \omega_0 \times \left(1 - \frac{r^2}{a^2}\right)^2$$

where ω(r) represents the deformation of the membrane (or deform) as a function of the distance r from its centre (which is also the optical centre of the lens), a represents its radius and $\omega_o$ its maximum deflection in its centre.

The approximation made is to consider the membrane as anchored to its periphery and subjected to a constant pressure. In terms of deform, the real profile of the dioptre needs to be determined more precisely for example by means of mechanical simulation software such as ANSYS for example. The real deform is very likely situated between the approximate deform and a spherical deform.

By varying the thickness of the membrane and the nature of the strain exercised by the actuation means, it is possible to vary the deform and thus change the shape of the dioptre and the focal distance.

The mechanical behaviour of the membrane depends particularly on the surface area of the area 2.2 stressed by the actuation means 5. It is arranged so that the rigidity of the membrane 2 in the optical field 2.1, in other words the parameters E, ν and h, is in keeping with the surface area of the area 2.2 stressed by the actuation means 5 and with the force that the actuation means 5 develop. Indeed, the pressure exercised by the liquid 4 on the optical field 2.1 multiplied by the total surface area of the membrane in contact with the liquid is equal in a first approximation, by considering the liquid as incompressible, to the electrostatic force between the electrodes of the actuators or the actuator.

The mechanical behaviour of the membrane in the optical field depends on the maximum deflection of the membrane, the force applied by the actuation means 5, their travel and the surface area of the stressed area 2.2. Several iterations may be necessary to adapt the mechanical behaviour of the optical field 2.1 with the magnitudes listed above.

To reach a worthwhile compromise, firstly one or more materials must be chosen for the membrane as a function of the desired variation in the focal distance and the geometry of the optical field, the method of making the membrane and the actuation means, the thickness of the membrane, several thicknesses may be examined. The maximum pressure in the optical field must then be determined. The surface area of the stressed area is optimised by taking the most favourable case where the stressed area is continuous and uniform around the optical field, by comparing the strains and travels necessary for the actuation in order to obtain the requisite variation in focal distance compatible with the actuation technology retained, taking into account the overall size, which it is aimed to reduce. If a dead end is reached, the iterations are begun once again by changing materials for the membrane.

Since the candidates in terms of materials are numerous, the thickness of the membrane can vary in a significant manner, the maximum pressure required may thus be adjusted in a judicious manner.

When there are several stressed areas, the number of stressed areas is also an important parameter for the elaboration of the optical device, object of the invention. Each of these areas is controlled by an actuator dedicated to this area.

Figure 7A:
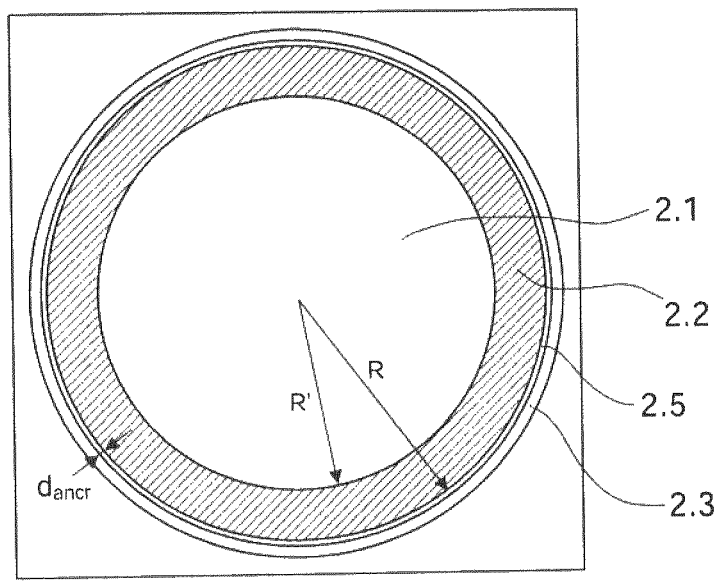
FIGS. 7A, 7B illustrate two alternatives of an optical device according to the invention in which various magnitudes are estimated in the description.
Figure 7B:
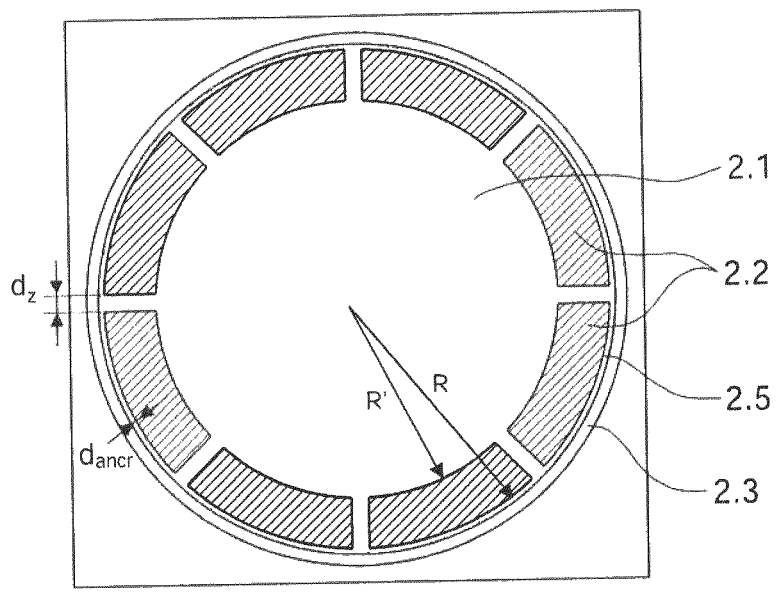

Two parameters are important when there are several stressed areas 2.2, namely the distance $d_z$ separating two consecutive stressed areas 2.2 on the one hand and the distance $d_{ancr}$ between the stressed areas and the anchoring to the support 1.5 on the other hand. The distances $d_z$ and $d_{ancr}$ are illustrated in FIGS. 7A, 7B.

The aim is that these distances $d_z$ and $d_{ancr}$ are not too great or do not apply to too flexible parts of membrane, since these portions must withstand the pressure exercised by the actuation means 5 on neighbouring stressed areas. These portions must not be too rigid either so as not to hinder the displacement of neighbouring stressed areas 2.2. The aim is that they behave in a manner as close as possible to the stressed areas 2.2.

As regards the electrostatic actuation means 5, they do not pose any problem to those skilled in the art. Reference may be made to the following publication as regards "zipping" type electrostatic actuators: "A novel external electrode configuration for electrostatic actuation of MEMS based devices" Journal of Micromechanics and Microengineering N°14 (2004) pages 446 to 451. In this article, it is mentioned in FIG. 8 that beams of 400 micrometres make it possible to obtain a travel entirely compatible with that which is required in the optical device according to the invention.

A typical example of "zipping" type electrostatic actuation means is represented in a detailed manner in FIGS. 8A, 8B. The actuation means are formed of several actuators 5, two diametrically opposite actuators may be seen in FIG. 8. They each comprise a fixed electrode 5.12 borne by the support 1.5 and a moving electrode 5.11 borne by the membrane 2, the membrane serving as additional electrical insulator between the two electrodes 5.11, 5.12 in addition to the liquid 4. The stressed area 2.2 of the membrane 2 corresponds to the hold that the moving electrode 5.12 has on the membrane 2. Under the effect of a potential difference applied between the two electrodes 5.11, 5.12, the moving electrode 5.12 approaches the fixed electrode 5.11 and it displaces the membrane 2 to make it come closer to the support 1.5. The displacement of the membrane expels, towards the optical field 2.1, the liquid 4 contained between the membrane 2 and the support 1.5 at the level of the stressed area 2.2. FIG. 8A shows the actuation means at rest and FIG. 8B the actuation means 5 activated. The membrane 2 is included in the actuation means 5 since it serves as electrical insulator between the two electrodes 5.11, 5.12. In these figures, there is no dish, the support 1.5 is substantially flat. The liquid 4 and the membrane contribute to the actuation of the actuation means. They are dielectrics. The higher the permittivity of the liquid 4 and the membrane 2, the more the moving closer of the moving electrode 5.12 towards the fixed electrode 5.11 will be started easily and thus the better will be the actuation performances. The parameters to take into account for the liquid and the additional dielectric are their permittivity and breakdown voltage. They must be sufficiently high.

Figure 9A:
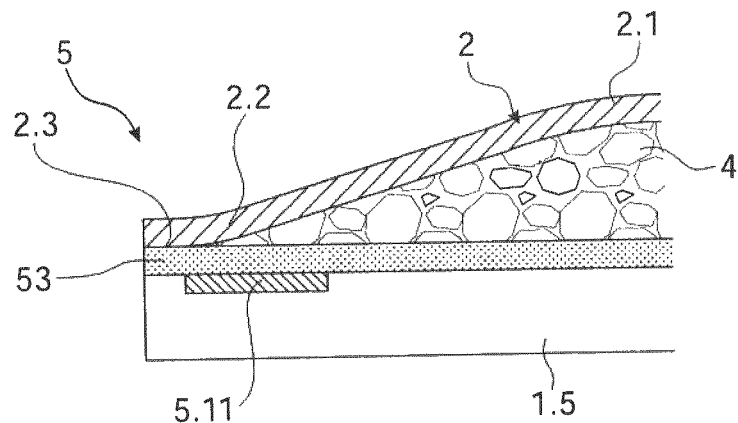
FIGS. 9A, 9B show in greater detail another example of the electrostatic actuation means at rest or activated.
Figure 9B:
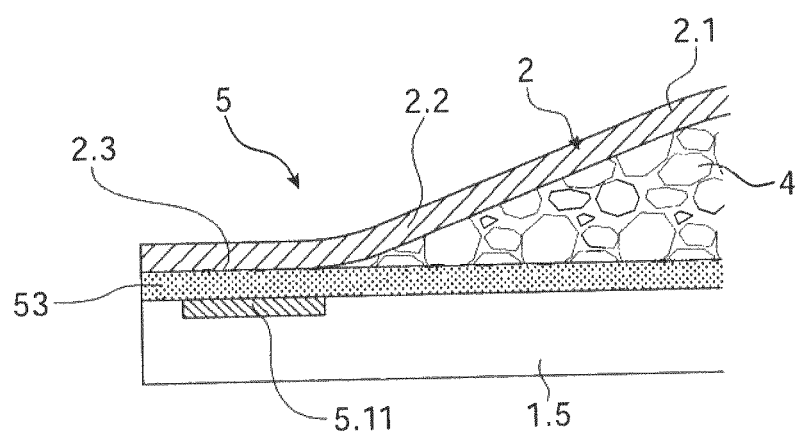

In an alternative illustrated in FIGS. 9A, 9B, the membrane 2 is now made of electrically conducting material. The fixed electrodes 5.11 are borne by the support 1.5. It is they that impose the shape of the stressed area. A dielectric layer 53 covers them, said dielectric layer 53 can line the support 1.5 so as to be in contact with the liquid 4 and extend to the level of the optical field of the optical device. In an alternative, said dielectric layer may be localised and spare the optical field. The dielectric layer 5.3 may for example be made of silicon oxide or silicon nitride, if the support 1.5 is made of glass. The membrane 2 is made of an electrically conducting material, for example tin and indium oxide. This material is widely used in liquid crystal devices to form electrodes. The membrane 2 serves as moving electrode, it is more precisely the portion of the membrane 2 that is facing the fixed electrode 5.11 that has this role. The area 2.2 stressed by the actuation means 5 corresponds to the hold that the fixed electrode 5.11 has on the membrane 2. FIG. 9A shows the actuation means 5 at rest and FIG. 9B the actuation means 5 activated. The membrane 2 is included in the actuation means 5 since it serves as moving electrode.

The membrane 2 may be formed for example from a film of PET (polyethylene terephthalate) covered with a film of ITO (tin and indium oxide). The ITO is located on the liquid 4 side. The membrane may be applied by laminating the film.

Figure 10A:
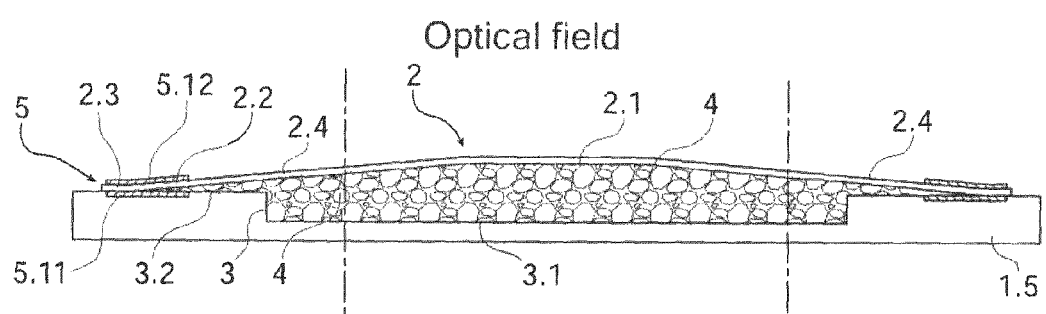
FIGS. 10A, 10B show an example of optical device according to the invention in which the liquid overflows the dish.
Figure 10B:
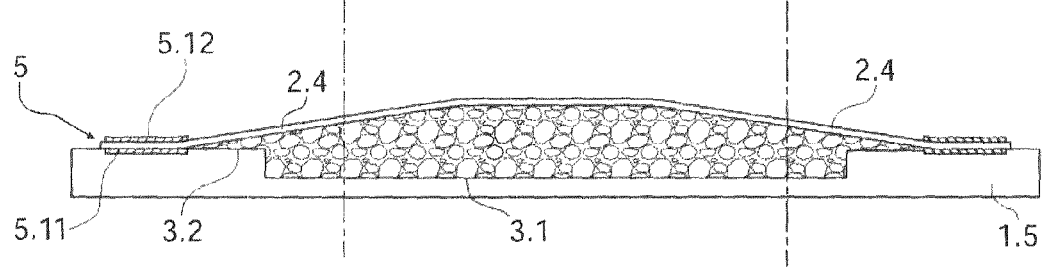

In an alternative in FIG. 8, where the support was substantially flat, it may be worthwhile benefiting from a dish 3 while conserving, at the level of the actuation means 5, the liquid 4. The anchoring of the membrane 2 on the support 1.5 takes place quite far from the dish 3, the stressed area 2.2 and thus the actuation means 5 are at the edge 3.2 of the dish 3, the liquid 4 overflows from the dish 3 and extends onto the edge 3.2 of the dish 3, while being contained by the membrane 2. Reference is made to FIGS. 10A, 10B. A guard area 2.4 has been provided for between the stressed area 2.2 and the optical field 2. FIG. 10A shows the actuation means 5 at rest and FIG. 10B shows the actuation means 5 activated. This configuration combines the advantages of the configuration without dish with substantially flat support and the advantages of the configuration with dish at the level of the optical field.

The advantage of using electrostatic actuation means is that they are not very sensitive to impacts. In the case of impact, the weight of the liquid deforms the membrane, and since the membrane is dimensioned to withstand these deformations, the actuation means do not add other additional strains. The size may be reduced to the minimum.

Such an optical device according to the invention may be manufactured using technologies employed in microelectronics and in microsystems. It is possible to employ, both for the membrane and the actuation means, techniques for depositing thin films by chemical vapour deposition (CVD), by electrodeposition, by epitaxy, by thermal oxidation, by physical vapour deposition (PVD), or instead by evaporation. The techniques of laminating films, spin coater deposition for organic or sol gel materials, moulding, hot embossing, nano printing, bonding of two substrates by direct bonding, by eutectic bonding, by anodic bonding, by organic bonding may also be used.

An example will now be described of a method for making an optical device with variable focal distance according to the invention. A sacrificial layer is going to be used. Reference is made to FIGS. 11A to 11E.

The starting point is a substrate 100 in which a dish 3 has been etched. The substrate 100 may for example be made of glass. One or more fixed electrodes 5.11 (FIG. 11A) are deposited at the bottom of the dish. A sacrificial material 101 (FIG. 11B) is deposited in the dish 3 and on the fixed electrodes. The sacrificial material 101 may be organic, a photosensitive resin for example, or an inorganic material such as silicon oxide.

Figure 11A:
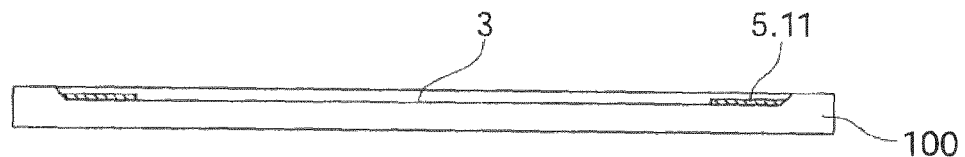
FIGS. 11A to 11E illustrate steps of an example of embodiment of an optical device according to the invention.
Figure 11B:
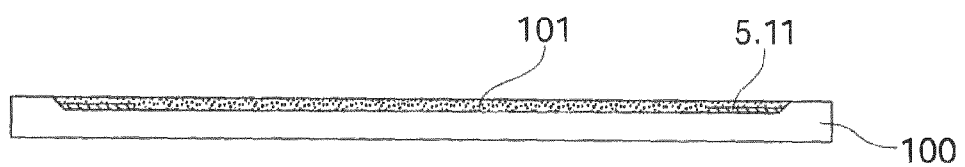
Figure 11C:
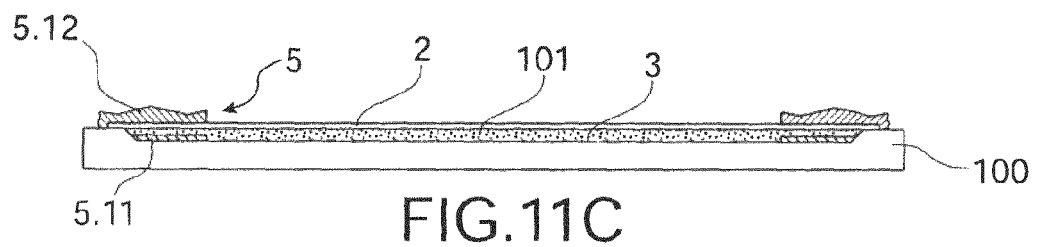
Figure 11D:
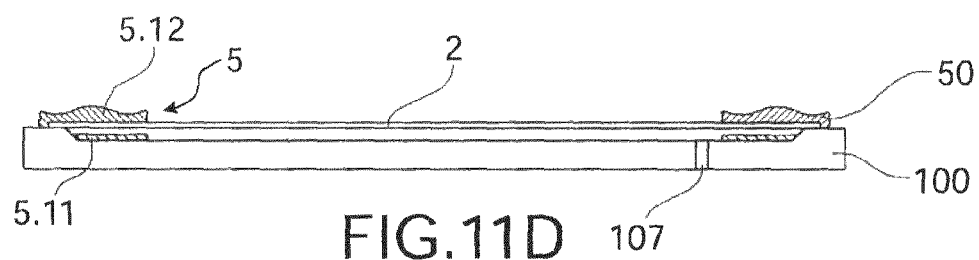
Figure 11E:
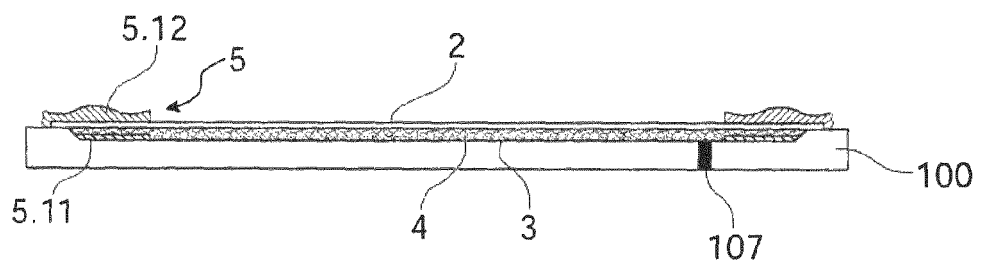

The membrane 2 is formed on the sacrificial layer 101, so that it sticks out over the edge of the dish 3 and anchors itself there (FIG. 11C). An inorganic material such as silicon oxide, silicon nitride may be deposited. This material is dielectric. The deposition may be carried out with a spin coater or by chemical vapour deposition. One or more moving electrodes 5.12 aimed at completing the actuation means 5 are formed locally on the membrane 2. The membrane 2 is then freed by removing the sacrificial layer 101. To do this, at least one hole 107 may be pierced traversing the substrate 100 until it reaches the sacrificial layer 101. The hole 102 passes through and opens out into the dish 3 (FIG. 11D). The removal may be chemical or thermal or by oxygen plasma. The dish 3 is then filled with the liquid 4 (FIG. 11E). The filling can be carried out by placing the dish 3 in a vacuum to favour the penetration of the liquid 4 and avoid the formation of bubbles. Finally, the hole 107 is filled so that the liquid 4 cannot escape (FIG. 11E). An organic material may be used. The order of the steps is not limitative.

The moving electrodes 5.12 could also be formed after freeing the membrane 2, for example before the filling or after. It is also possible to form them on the sacrificial layer 101 before forming the membrane 2, if they have to be located on the liquid 4 side. In such a configuration, it may be that the moving electrodes 5.12 are deposited astride the sacrificial layer 101 and the substrate 100 and that the membrane 2 totally or partially surmounts the moving electrodes 5.12.

In FIG. 11, the moving electrodes 5.12 are represented in contact with the substrate 100, which is not an obligation, they could not have stuck out from the membrane 2.

If it is desired that the membrane 2 at rest is bulging, concave or convex, an appropriate curvature is given to the sacrificial layer 101, since it serves as mould for the membrane 2. Another solution to obtain a bulging membrane 2 would be to buckle it after having freed it. The buckling may be thermal. The determining parameters are then the difference in thermal expansion coefficient between the membrane and the substrate and the deposition temperature of the membrane.

To protect the membrane 2, it is possible that the optical device of the invention is formed by the assembly of two supports, a first support 110 supporting the membrane 2 and one or more moving electrodes 5.12 and the second support 100 supporting one or more fixed electrodes 5.11 and the liquid 4. The first support 110 serves as mechanical protection for the optical device of the invention. A joint J of adhesive is used to assemble the two supports 100, 110 and contain the liquid 4 in the cavity that it helps to delimit. The fixed electrodes 5.11 are coated with the additional dielectric 53. The first support 110 is hollowed out in its central part, said hollowing out 115 will correspond at least to the optical field 2.1 of the membrane 2 once the supports 100, 110 have been assembled. Reference is made to FIG. 13.

An advantageous configuration of the membrane of a variable focal distance optical device according to the invention will now be described in terms of geometry. It is assumed that the liquid 4 rests on a flat bottom. Reference is made to FIG. 7A. The membrane is circular, its optical field 2.1 is circular and all the areas that surround it, including the stressed area 2.2, are concentric crowns.

The uniformly loaded circular plate model, anchored on its periphery and subjected to considerable deflections in relation to the thickness of the plate, is used to calculate the characteristics of the membrane, this model is presented in the work of S. Timoshenko cited above.

The maximum deflection $\omega_o$ of the optical field is given by the formula $$\omega_0 = \frac{Pa^4}{64D} \cdot \frac{1}{1 + 0.488 \frac{\omega_0^2}{h^2}} \text{ where } D = \frac{Eh^3}{12(1-v^2)}$$

where P is the pressure exercised on the optical field, a is the radius of the optical field, E is the Young's modulus of the material constituting the membrane in the optical field, $v$ is the Poisson's coefficient of the material constituting the membrane in the optical field, h is the thickness of the membrane in the optical field.

The optical field 2.1 may have a diameter of 2.5 mm, there is no guard area between the optical field 2.1 and the stressed area 2.2, but there is an intermediate guard area 2.5 between the optical field 2.1 and the anchoring area 2.3. The width of the anchoring area is equal to 200 micrometres. The stressed area 2.2 is between an interior radius R' of 1.25 mm and an exterior radius R varying between 1.35 and 2.05 millimetres. The surface area of the stressed area 2.2 thus varies between 0.8 and 8.3 square millimetres. It is assumed that the membrane is made of parylene, that its thickness is 1 micrometre and that the requisite maximum deflection in the central area of the optical field is 20 micrometres. The force exercised by the actuation means along the z axis varies between 0.2 and 0.4 mN. From this force, to determine the voltage to apply between the electrodes, reference simply needs to be made to the works of the prior art dealing with electrostatic forces such as for example "Simulations based Design for a Large Displacement Electrostatically Actuated Microrelay", Gooi Boon Chong et al., Proceeding of SPIE, vol. 4408 (2001), pages 254-262.

The travel of the stressed area 2.2 varies between 3 micrometres for a surface area of 8.3 mm² and 7 micrometres for a surface area of 0.8 mm². The width $d_{ancr}$ of the intermediate guard area 2.5 may extend up to 0.2 mm.

By taking all of the approximations made and refining the dimensioning, either experimentally or by mechanical and optical simulations, it is probable that the forces and travel could be reduced, which will simplify the dimensioning of the actuation means and make the optical device even more compact.

Another numerical example is described below. Reference is made to FIG. 7B. The only difference with FIG. 7A is that now provision is made for several stressed areas 2.2, which are in fact eight sectors of circular crown arranged around the central area 2.1. The different sectors of circular crown are spaced apart by a distance $d_z$ equal to several tens to several hundreds of micrometres. The surface area of the reinforced area 2.2 is expressed by:

$\pi(R^2-1.25^2)-8d_z(R-1.25)$

The distance $d_z$ must not hinder the correct operation of the variation in the focal distance.

A compromise has to be made between the number of stressed areas 2.2 and their surface areas and thus the size of the actuation means. The choice of the number of stressed areas 2.2 also depends on the capacity of the actuation means to actuate in a substantially identical manner each of the stressed areas and the nature of the strain exercised by the actuation means.

It may be that optical aberrations appear with an optical device according to the invention. They are linked to the lack of parallelism between the edge of the deformed membrane 2 and the support 1.5 at the level of the anchoring. They result in a maximum deflection $\omega_o$, which is no longer at the centre of the optical field 2.1. The optical axis of the optical device passes through the centre of the optical field 2.1. The quality of the images is deteriorated.

To limit such a phenomenon in conventional liquid lenses, it was aimed to optimise the assembly of the membrane to the support, this assembly was based on sealing techniques so that at rest the requisite parallelism is obtained. But then when the lens is in operation, it may be necessary to vary its focal distance by means of a supply voltage V0 used to actuate the actuation means 5. If the displacement induced by the actuation means 5 is not uniform over the whole periphery of the liquid lens, the phenomenon appears and the quality of the image is degraded. The space between the bottom 3.1 of the dish 3 and the stressed area 2.2 of the membrane 2 is not constant over the whole periphery of the membrane. This anomaly can also occur in an optical device according to the invention if nothing is done during the command of the actuation means 5. When the actuation means comprise several actuators 5, they may not be supplied with exactly the same voltage V0. A drift in the course of certain actuators 5 may occur. The pressure of the liquid 4 may not be totally uniform over the whole periphery of the membrane, this can occur if the device is employed slightly sloping on one side. In operation, the phenomenon is thus difficult to control and strongly penalises this type of optical device. In order to combat against this effect, it is possible to provide for a control of the command of the actuation means 5.

Figure 12:
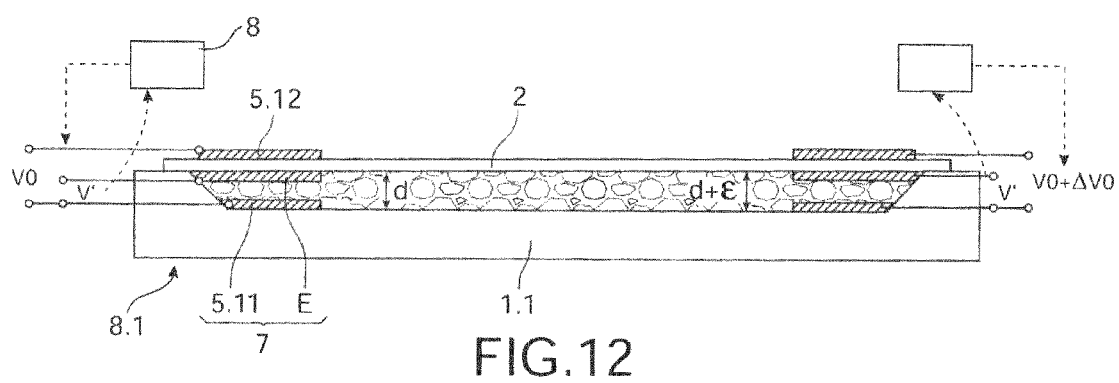
FIG. 12 shows an optical device according to the invention provided with capacitive means for measuring the thickness of liquid, which cooperate with automatic means for controlling actuation means as a function of the thickness of liquid.

Reference is made to FIG. 12. The variation in the focal distance of the optical device is still obtained by means of the action of the electrostatic actuation means 5 when they are actuated, by application of a supply voltage V0 between the fixed electrode 5.11 and the moving electrode 5.12. In addition, means are provided for automatically controlling 8 the voltage to be applied to the actuation means 5 as a function of the thickness d of the liquid at the level of the stressed area 2.2. The automatic control means 8 cooperate with capacitive means 8.1 for measuring the thickness of the liquid, arranged in several places at the level of the stressed area or areas 2.2, preferably at the level of actuators 5. The measuring means 8.1 may comprise several pairs 7 of electrodes distributed at the level of the stressed area 2.2 or stressed areas 2.2. It is possible that at least one electrode of a pair is merged with a fixed electrode 5.11 of the actuation means 5. The other electrode E of a pair 7 is situated on the membrane 2, on the liquid 4 side. In an alternative, it is possible that the two electrodes of a pair are merged with the two electrodes of an actuator. Yet another configuration would be to dissociate actuator and pair 7 of electrodes from the measuring means 8.1. By applying a potential difference V' to the two electrodes 5.11, E of each pair 7 of electrodes 5.11, E and by measuring the capacity on each pair 7 of electrodes 5.11, E, at each of the pairs 7 of electrodes 5.11, E the quantity of liquid 4 located between the electrodes 5.11, E and thus the thickness of liquid between the membrane 2 and the bottom 3.1 of the dish 3 is acquired.

In FIG. 12, the automatic control means 8 have only been schematised, in addition they are only seen for two pairs of electrodes 5.11, E and two actuators 5 so as not to overburden the figure.

During the operation of the optical device object of the invention, if capacitive measurements are obtained that differ from one place to another, for example d, d+∈, the automatic control means 8 receive the capacitive measurements from the measuring means 8.1, compare them to a reference value that here corresponds to the spacing d otherwise measured, and command that a supplementary correction voltage ΔV0, in addition to the reference voltage V0, is applied to the corresponding actuators 5, at the places where the capacitive measurement differs from the reference value. Thus, all of the capacitive measurements are equalised to the reference value and thus all of the distances between the membrane 2 and the bottom 3.1 of the dish 3, by adjusting the supply voltages of actuators 5.

The parallelism necessary for the correct operation of the lens or the mirror is thus ensured by an automatic displacement control. Said automatic control does not pose any problem for those skilled in the art.

When it is wished to vary the focal distance of the optical device, a voltage V0 is applied to all of the actuators 5 of the actuation means as represented in FIG. 12, by means of the measuring means 8.1, the space d between the membrane 2 and the bottom 3.1 of the dish 3 is measured, the measurements are delivered to the automatic control means 8. If one or more pairs 7 of electrodes 5.11, E detect a parasitic shift ∈, the automatic control means 8 command the application of the additional correction voltage ΔV0 to one or more actuators 5 the closest to the pairs 7 of electrodes having detected the parasitic shift ∈. The additional correction voltage ΔV0 applied to one or more actuators 5 means that they locally displace the membrane 2 so that the shift ∈ is cancelled out.

The number of pairs 7 of electrodes is a function of the number of actuators 5 and their points of contact with the membrane 2, the surface area and the rigidity of the stressed area 2.2. The position of the pairs 7 of electrodes also need to be optimised as a function of the points of contacts of the actuators 5. Since the objective is to be able to compensate the shifts noticed by the pairs 7 of electrodes, it appears opportune to place a pair 7 of electrodes at each actuator 5. The configuration in which the electrodes of a pair of electrodes of the measuring means are merged with the electrodes of an actuator is particularly advantageous because particularly simple and cheap. It would obviously be conceivable to place the pairs 7 of electrodes between the actuators 5 but the automatic control would be more difficult to form.

The surface of the electrodes 5.11, E is directly linked to the thickness of the liquid 4 at rest and the higher the thickness of the liquid 4, the greater the surface areas of the electrodes 5.11, E.

Concerning their dimensioning, it is also necessary to integrate the precision necessary for the correct operation of the optical device. Indeed, the capacity C of the flat capacitor formed by the opposing electrodes 5.11, E is expressed by $C = \in'S'/e$ where S' is the surface area of the electrodes, e the thickness of the liquid and $\in'$ the permittivity of the liquid. The charge of the capacitor Q is expressed as $Q = CV'$ where V' is the potential difference applied to the electrodes of the capacitor. It ensues that $Q = \in'S'V'/e$. For given V and $\in'$, the larger is S' and the smaller is e, the larger is Q and thus the more sensitive the electrodes E1, E2. Given the performances targeted for the optical device, a maximum shift max between the electrodes may be tolerated without having an impact on the quality of the image. The measurement precision of the pairs of electrodes must be less than ∈max.

For the targeted applications of autofocus and zoom, the focal distance of the optical device needs to be modified with great rapidity, in other words a high frequency to ensure as short as possible a response time. In a still camera or film camera application, for several distances that the optical device takes during a variation in the focal distance, the image sensor that is present will be used to carry out an image test until the requisite focal distance is found. In such dynamic operation, the capacitive measurements are taken several times for a given focal distance. Indeed, several cycles of acquisition of capacitive measurements, comparison with a reference value, processing of data and command of actuators are necessary for each focal distance value in order to ensure the requisite optical quality. It is therefore necessary that the acquisition frequency of the capacitive measurements is considerably greater than the frequency of variation in the focal distance.

The entire part of processing of the signal associated with this control of the displacement by capacitive measurements needs to be optimised in order to reduce the response time of the liquid lens while at the same time ensuring a uniformity of displacement, within the acceptable limit for optical performances. This does not pose any problem for those skilled in the art.

The variation in the focal distance is controlled by the force delivered by the actuation means 5 but controlled in displacement by means of the automatic control means 8. Such a control of the displacement and thus of the deformation of the membrane makes it possible to improve considerably the optical quality of the optical device.

The undesirable effects of the orientation of use of the optical device of the invention are eliminated by two factors: firstly the limitation of the volume of liquid 4 and thus the minimisation of the weight of liquid 4 and secondly the control of the displacement of the membrane 2 by means of the capacitive measurement.

Other embodiments of the optical device of liquid lens type, object of the invention, will now be described. Reference is made to FIGS. 14A to 14E. In FIG. 14A, the support 1.5 of the membrane 2 is now formed of a frame 1 joined to a plate 1.1 to form the dish 3. The plate 1.1 materialises the bottom of the dish 3, it is transparent. There is no modification at the level of the membrane 2, nor at the level of the electrostatic actuation means 5, nor at the level of the liquid 4 compared to that which has been described previously.

The transparent plate 1.1 may be of substantially constant thickness, with substantially parallel flat faces, as in FIG. 14A. At least one face could be structured as in FIGS. 14B, 14C, 14D, where the exterior face is convex or concave. The choice is made as a function of the requisite optical performances. It lets pass an optical radiation, which traverses the lens. The frame 1 may be made of semi-conductor material such as silicon, which makes it able to integrate the circuits associated with the processing of the command of the actuation means, especially if an automatic control is provided for. The circuits are not represented so as not to overburden the figures. On the other hand, in FIG. 14A are represented a power supply pad 150 and a conducting track 151 electrically connected to the moving electrode 5.12 of the actuation means 5, said track 151 and said pad 150 being used during the actuation to apply the appropriate voltage to the moving electrode 5.12. The track and the pad associated with the fixed electrode are not visible, but those skilled in the art will have no difficulty conceiving them. Said pads and said tracks have been omitted in previous figures with the aim of not overburdening the figures, but they are obviously provided for. The transparent plate 1.1 may be made of glass or plastic material.

Figure 14E:
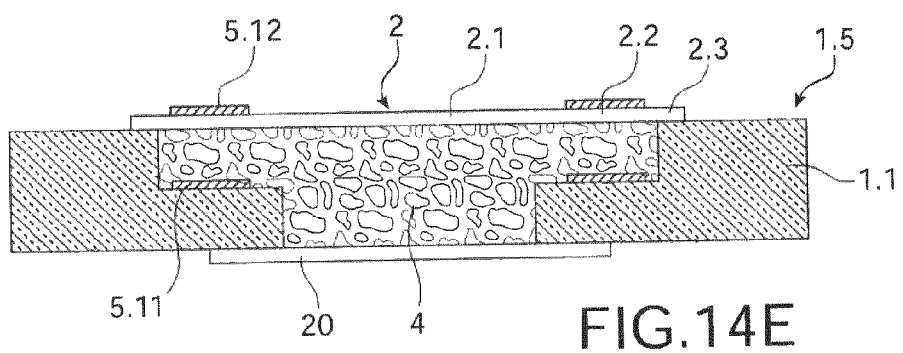
FIGS. 14A to 14F show different supports of optical devices according to the invention.
Figure 14F:
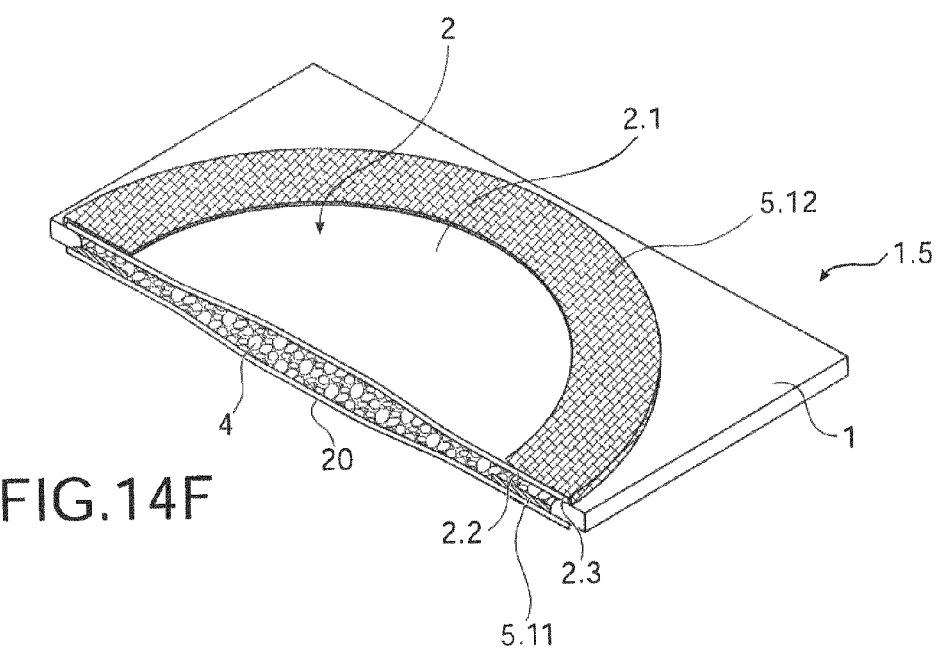
Figure 14A:
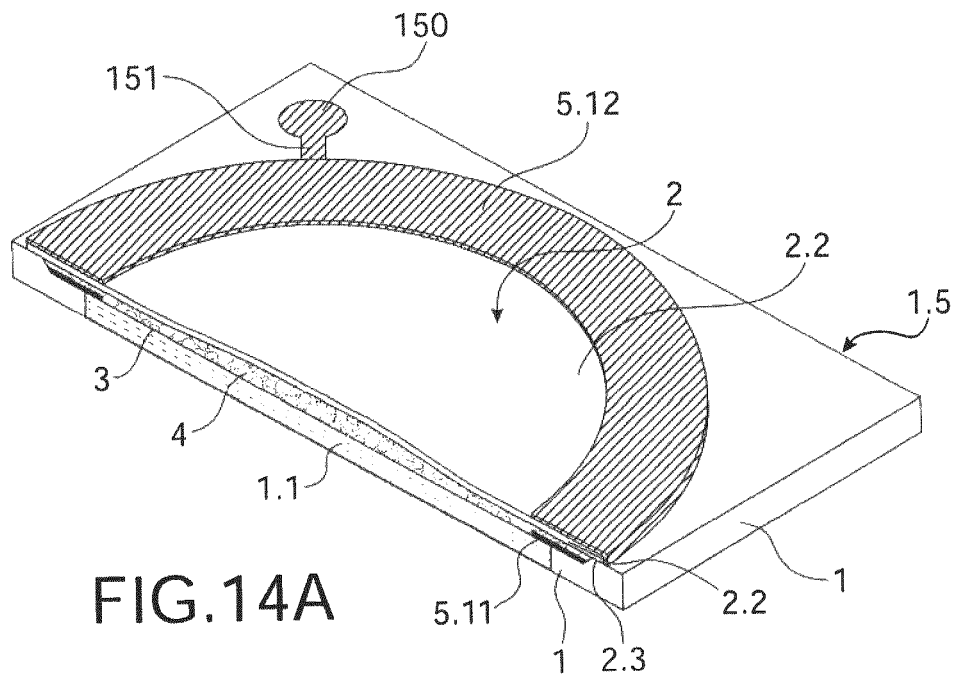
Figure 14B:
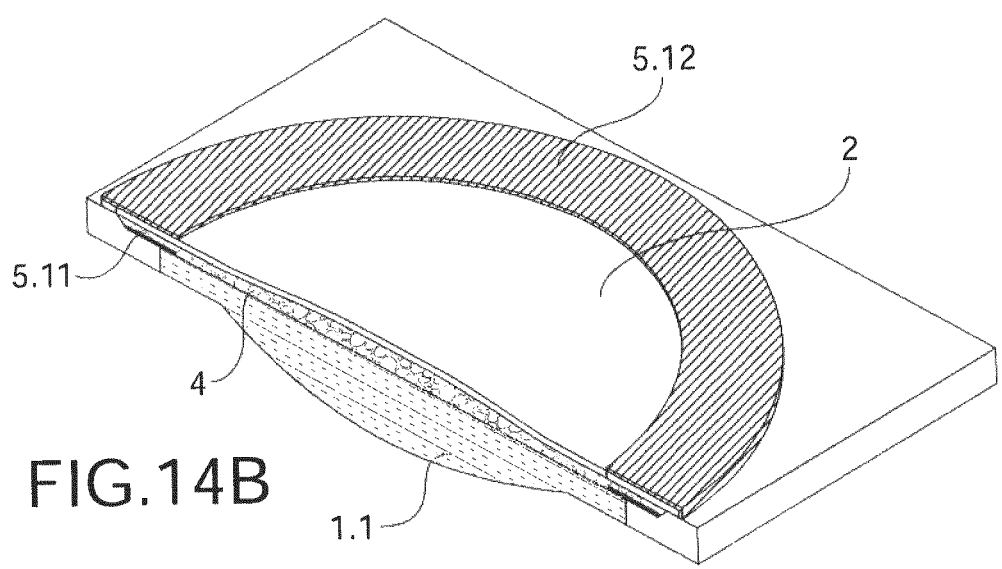
Figure 14C:
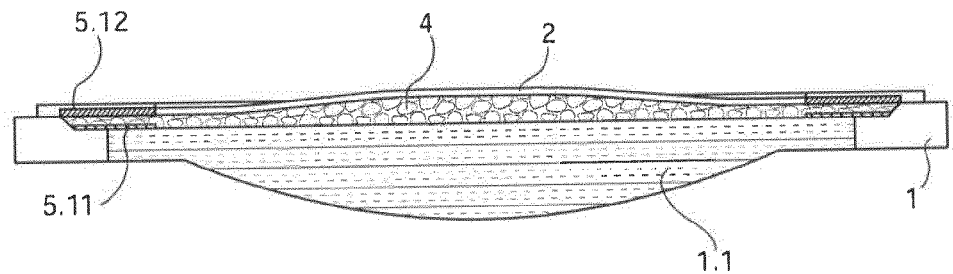
Figure 14D:
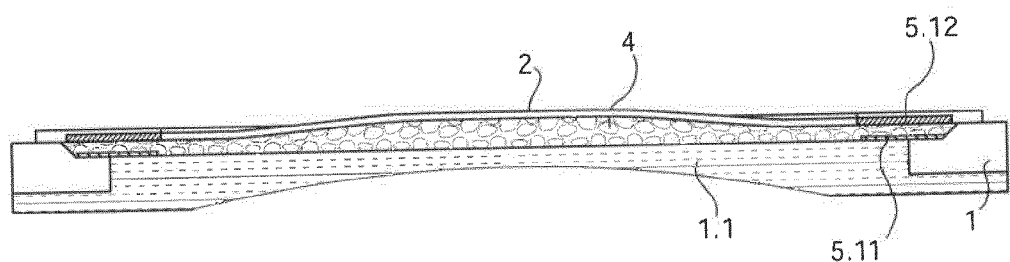

In FIGS. 14B, 14C, the transparent plate 1.1 is of convex structure and in FIG. 14D, it is of concave structure. The structuring of the transparent plate 1.1 may be obtained by machining or by moulding for example.

In FIG. 14E, the support 1.5 is materialised by the frame 1 and the transparent plate 1.1 is replaced by a second membrane 20. The two membranes 2, 20 are anchored on the frame 1, each on one of its principal faces. They help to form a housing for the liquid 4. This makes it possible to enhance the optical performances of the membrane. The electrostatic actuation means 5 are provided on just one of the membranes 2. The fixed electrode 5.11 is placed on a step of the frame 1.1. The three areas of the membrane provided with actuation means are represented. The other membrane 20 is not actuated, but it nevertheless deforms when the actuation means 5 are actuated.

In an alternative represented in FIG. 14F, it is possible to provide for each actuator an electrode in contact with a membrane 2 and an electrode in contact with the other membrane 20. In this configuration, the actuation means 5 comprise a single actuator. In this configuration, the two membranes 2, are actuated and the electrode 5.11 can no longer be considered as fixed electrode. It is joined to the support 1.5 including the frame 1 and the second membrane 20.

Such an optical device with variable focal distance is much simpler than existing devices, particularly when it only comprises a single membrane. In addition to the advantages of simplicity, compactness, production and cost, the reliability of the whole is thereby optimised in particular because the risk of leaks is limited.

The scale at which the optical device, object of the invention, is formed may be much smaller than that at which traditional liquid lenses are formed. Since production on wafer techniques are precise and repeatable, the quantities of liquid may thus be reduced, of the order of several hundredths of $mm^3$ to several $mm^3$. This advantage makes it possible to avoid two conventional problems, which are the effect of variations in temperature and pressure on the working of the optical device and its impact resistance. Indeed, by minimising the quantity of liquid, in a constant volume lens, the phenomena of expansion of this liquid under the effect of temperature and pressure variations are limited.

Furthermore, the lower the volume of liquid, the better the impact resistance of the optical device. Indeed, the mass of liquid is less and stresses the membrane less in the case of impacts.

Figure 15A:
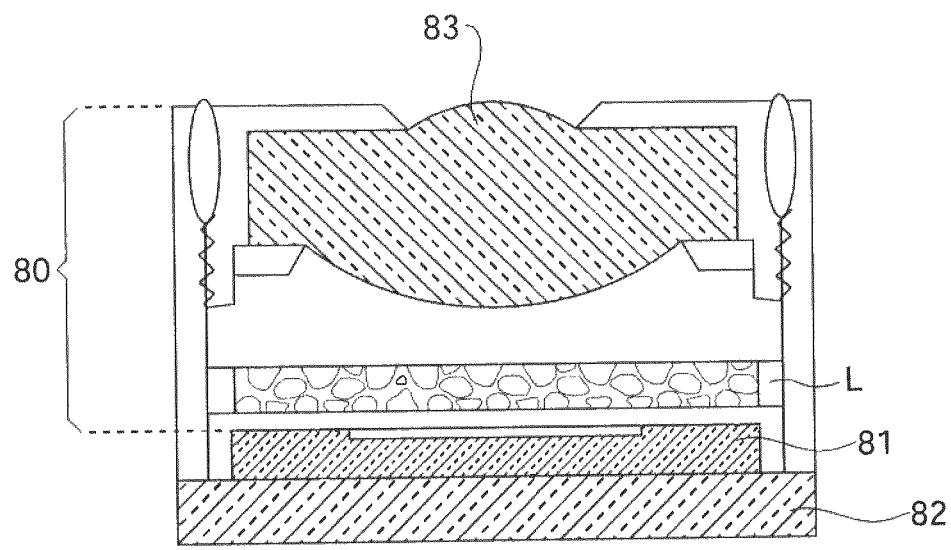
FIGS. 15A, 15B show two camera devices employing at least one optical device of the invention.

Such an optical device with variable focal distance may be employed in a camera device, particularly that of a portable telephone still camera. Reference is made to FIG. 15A. Such a camera device comprises, in cascade, an objective 80 including at least one optical device with variable focal distance L according to the invention of liquid type, an image sensor 81 for example of CCD or CMOS type borne by a substrate 82. In the example described, the objective comprises at least one lens 83 with fixed focal distance and a liquid lens L according to the invention. Hereafter, this lens with fixed focal distance 83 will be known as conventional optical set. The liquid lens L is located between the conventional optical set 83 and the image sensor 81. In an alternative, the conventional optical set 83 may be located between the liquid lens L and the image sensor 81. The conventional optical set 83 is static. As has been seen previously, by virtue of its method of production, the liquid lens L may be compared to a MOEMS (microoptoelectromechanical system). The liquid lens L with variable focal distance is placed at a certain distance, which depends on the characteristics of the objective 80, the image sensor 81, but if this distance is small, the liquid lens L and the image sensor 81 could form only a single component by integrating them either in AIC (Above Integrated Circuit) technology, or in WLCSP (Wafer Level Chip Scale Package) technology. The focal distance of the liquid lens L is adapted by optimising the pressure of the liquid at rest, but also the curvature of the membrane at rest and the refractive index of the liquid.

Figure 15B:
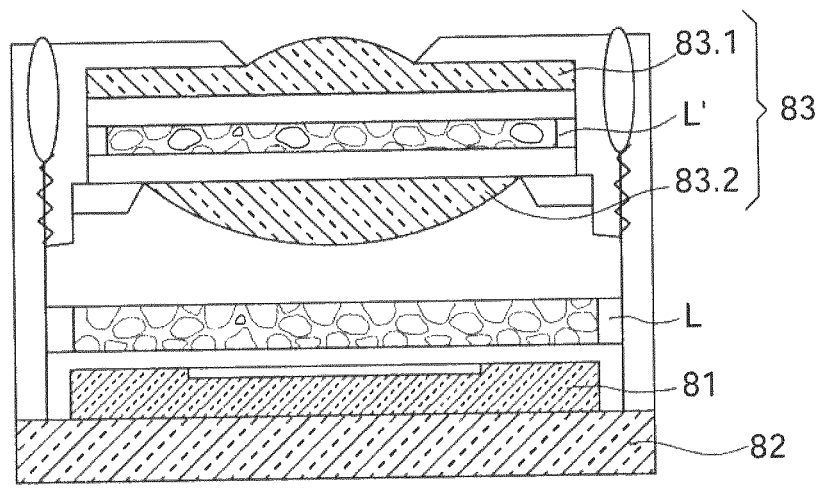
Figure 16A:
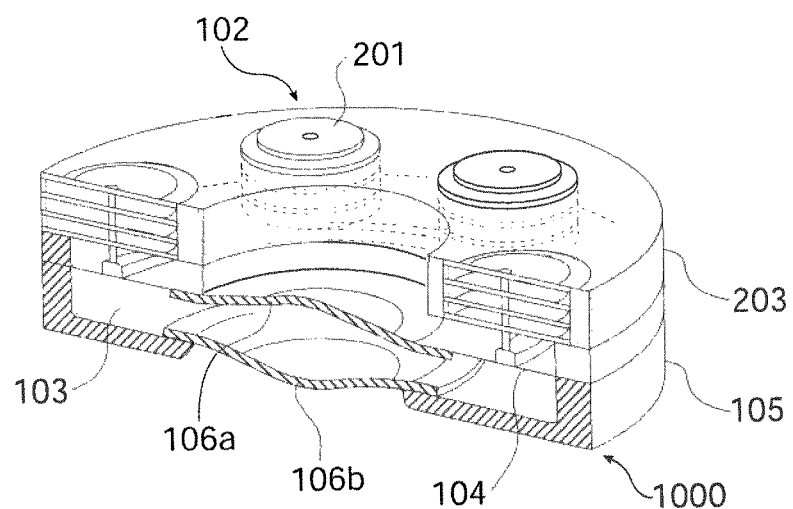
FIGS. 16A, 16B show conventional liquid lenses.
Figure 16B:
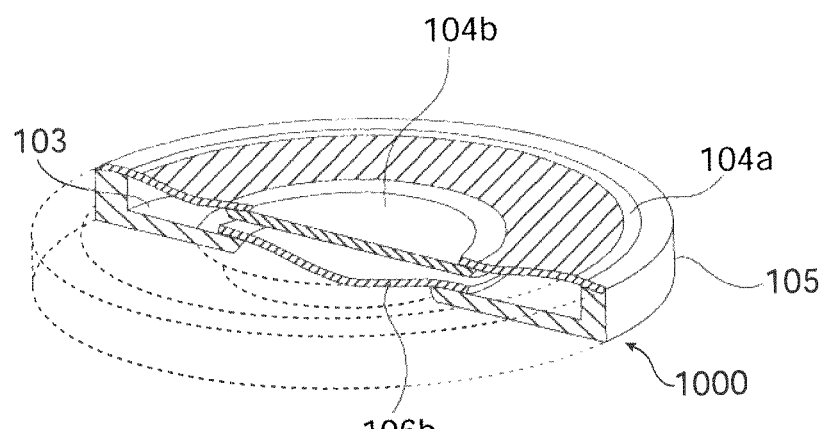

If the camera device also includes the zoom function as in FIG. 15B, an optical set 83 will be used with at least two lenses with fixed focal distance 83.1, 83.2 and two liquid lenses L and L', one of which is located between the two lenses 83.1, 83.2 of the optical set 83 and the other near to the image sensor 81 as in FIG. 15B.

Although several embodiments of the present invention have been described in a detailed manner, it will be understood that different changes and modifications may be made without going beyond the scope of the invention and in particular many other methods may be used to form the membrane and the actuation means.

The invention claimed is:

1. An optical device with a deformable membrane comprising:
   a peripheral area which is anchored in a sealed manner on a support helping to contain a constant volume of liquid in contact with a rear face of the membrane, said peripheral area is an anchoring area that is a sole area of the membrane that is anchored on the support;
   a substantially central area, configured to be deformed reversibly from a rest position; and
   an actuation device that displaces the liquid in the central area, stressing the membrane in at least one area situated strictly between the central area and the anchoring area, wherein the actuation device is electrostatic and comprises at least one pair of opposing electrodes, one of the electrodes of the pair being at a level of the rear face of the membrane or buried in the membrane, the other being at a level of the support, the electrodes being separated by dielectric, the dielectric being formed at least by the liquid.

2. An optical device according to claim 1, wherein the dielectric is formed, in addition to the liquid, of an additional dielectric arranged on at least one of the opposing electrodes, the dielectric being in contact with the liquid.

3. An optical device according to claim 1, wherein the membrane is uniform between the optical field and the stressed area.

4. An optical device according to claim 1, wherein the stressed area extends up to the central area without encroaching upon the central area or stops before the central area.

5. An optical device according to claim 1, wherein the stressed area extends up to the anchoring area without encroaching upon the anchoring area or stops before the anchoring area.

6. An optical device according to claim 1, wherein the pair of electrodes cooperates with a mechanical stop to prevent the electrodes of the pair coming into contact during actuation.

7. An optical device according to claim 1, wherein the membrane is monolayer or multilayer.

8. An optical device according to claim 7, wherein the membrane comprises at least one continuous layer that occupies the whole surface of the membrane.

9. An optical device according to claim 1, wherein the electrode situated at the level of the membrane extends beyond the stressed area coming into contact with the anchoring area.

10. An optical device according to claim 9, wherein the electrode situated at the level of the membrane comes into contact with the support.

11. An optical device according to claim 1, wherein when there is a single stressed area, the stressed area surrounds the central area, and when there are plural stressed areas, they each surround the central area or all of the stressed areas surround the central area.

12. An optical device according to claim 1, wherein the stressed area is a crown or a portion of crown.

13. An optical device according to claim 12, wherein the stressed area includes radial fingers projecting towards the anchoring area or towards the central area.

14. An optical device according to claim 1, wherein plural stressed areas form a discontinuous crown around the central area, the membrane further comprising a continuous reinforcement area surrounding the central area, more rigid than the stressed areas, situated between the central area and the stressed areas.

15. An optical device according to claim 1, wherein the support is substantially flat or comprises a dish to accommodate the liquid.

16. An optical device according to claim 1, wherein the support comprises a dish with a bottom and a sloping side, the electrode at the level of the support extending on the bottom and the side.

17. An optical device according to claim 1, wherein the support comprises a frame and a second membrane anchored on the frame, the electrode situated at the level of the support being in contact with the second membrane.

18. An optical device according to claim 1, wherein the support comprises a frame and a transparent plate fixed to the frame helping to form a dish for the liquid, the transparent plate having substantially flat and parallel faces or one face external to the dish substantially concave or one face external to the dish substantially convex.

19. An optical device according to claim 1, wherein the support comprises two substrates assembled together, the membrane being joined to one of the substrates, the electrode situated at the level of the support being joined to the other substrate.

20. An optical device according to claim 1, further comprising capacitive means for measuring the thickness of liquid at the level of the stressed area.

21. An optical device according to claim 20, wherein the capacitive measuring means may be merged or partially merged with the electrodes of the actuation device.

22. An optical device according to claim 20, further comprising means for automatically controlling the actuation device as a function of the thickness of liquid measured.

23. An optical device according to claim 1, wherein the membrane is made from organic based materials or polydimethylsiloxane, polymethyl methacrylate, polyethylene terephthalate, polycarbonate, parylene, epoxy resins or inorganic materials such as silicon, silicon oxide, silicon nitride, silicon carbide, polycrystalline silicon, titanium nitride, diamond carbon, tin and indium oxide, aluminium.

24. An optical device according to claim 1, wherein the liquid is propylene carbonate, water, an index liquid, an optic oil.

25. An optical device according to claim 1, which is a liquid lens or a mirror.

26. A camera device, comprising at least one optical device according to claim 1.

* * * * *